US008689924B2

(12) United States Patent
Okamoto et al.

(10) Patent No.: US 8,689,924 B2
(45) Date of Patent: Apr. 8, 2014

(54) AIR-BAG DEVICE

(75) Inventors: Yutaka Okamoto, Wako (JP);
Fumiharu Ochiai, Wako (JP); Yuji Kikuchi, Wako (JP); Koji Ikeda, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/695,658

(22) PCT Filed: Apr. 22, 2011

(86) PCT No.: PCT/JP2011/059904
§ 371 (c)(1),
(2), (4) Date: Nov. 1, 2012

(87) PCT Pub. No.: WO2011/142230
PCT Pub. Date: Nov. 17, 2011

(65) Prior Publication Data
US 2013/0048405 A1    Feb. 28, 2013

(30) Foreign Application Priority Data

May 12, 2010  (JP) .................................. 2010-110449
May 12, 2010  (JP) .................................. 2010-110450
May 13, 2010  (JP) .................................. 2010-110814
May 14, 2010  (JP) .................................. 2010-111901

(51) Int. Cl.
*B60R 21/34* (2011.01)
*B60R 21/36* (2011.01)
(52) U.S. Cl.
CPC ................ *B60R 21/36* (2013.01); *B60R 21/34* (2013.01)
USPC ................... 180/274; 280/728.2; 296/187.04
(58) Field of Classification Search
USPC ............... 296/187.04, 203.02; 180/69.2, 274; 280/728.1, 728.2
See application file for complete search history.

(56) References Cited

U.S. PATENT DOCUMENTS 7,584,988 B2 *  9/2009  Okamoto et al. .......... 280/730.1
7,988,183 B1 *  8/2011  Okamoto et al. .......... 280/728.2
(Continued)

FOREIGN PATENT DOCUMENTS

| EP | 1295763 A2 * | 3/2003 |
| EP | 2465735 | 6/2012 |
| GB | 2397559 | 7/2004 |
| JP | 2002-283939 | 10/2002 |
| JP | 2005-096686 | 4/2005 |

(Continued)

OTHER PUBLICATIONS

Partial European Search Report dated Nov. 29, 2013, 2 pages.

*Primary Examiner* — James English
(74) *Attorney, Agent, or Firm* — Rankin, Hill & Clark LLP

(57) ABSTRACT

An air-bag device in which a deployed air-bag has a complete deployment portion positioned on the longitudinally central side and having a substantially constant diameter and incomplete deployment portions positioned on longitudinally opposite end sides and having a diameter that gradually decreases in going toward a blocking member, the incomplete deployment portion has high rigidity compared with the complete deployment portion and is difficult to deform when there is a collision with a pedestrian, thus degrading the impact absorption performance, but disposing the plurality of vent holes in the incomplete deployment portion at a fixed pitch in the longitudinal direction and the circumferential direction of the air-bag enables the rigidity of the incomplete deployment portion to be lowered and the impact absorption performance to be enhanced, thereby giving uniform impact absorption performance over the entire longitudinal length of the air-bag.

23 Claims, 28 Drawing Sheets

(56) References Cited

U.S. PATENT DOCUMENTS

| | | | |
|---|---|---|---|
| 8,365,857 B2* | 2/2013 | Okamoto et al. | 180/274 |
| 2007/0114090 A1* | 5/2007 | Okamoto et al. | 180/274 |
| 2008/0315565 A1* | 12/2008 | Kawabe et al. | 280/728.2 |
| 2009/0167003 A1* | 7/2009 | Shigemura | 280/730.2 |
| 2010/0252351 A1* | 10/2010 | Okamoto et al. | 180/274 |

FOREIGN PATENT DOCUMENTS

| | | |
|---|---|---|
| JP | 2006-159971 | 6/2006 |
| JP | 2006-282105 | 10/2006 |
| JP | 2007290615 | 11/2007 |
| JP | 2009-143552 | 7/2009 |
| JP | 2009-154679 | 7/2009 |
| JP | 2009234319 | 10/2009 |

* cited by examiner

FIG. 3
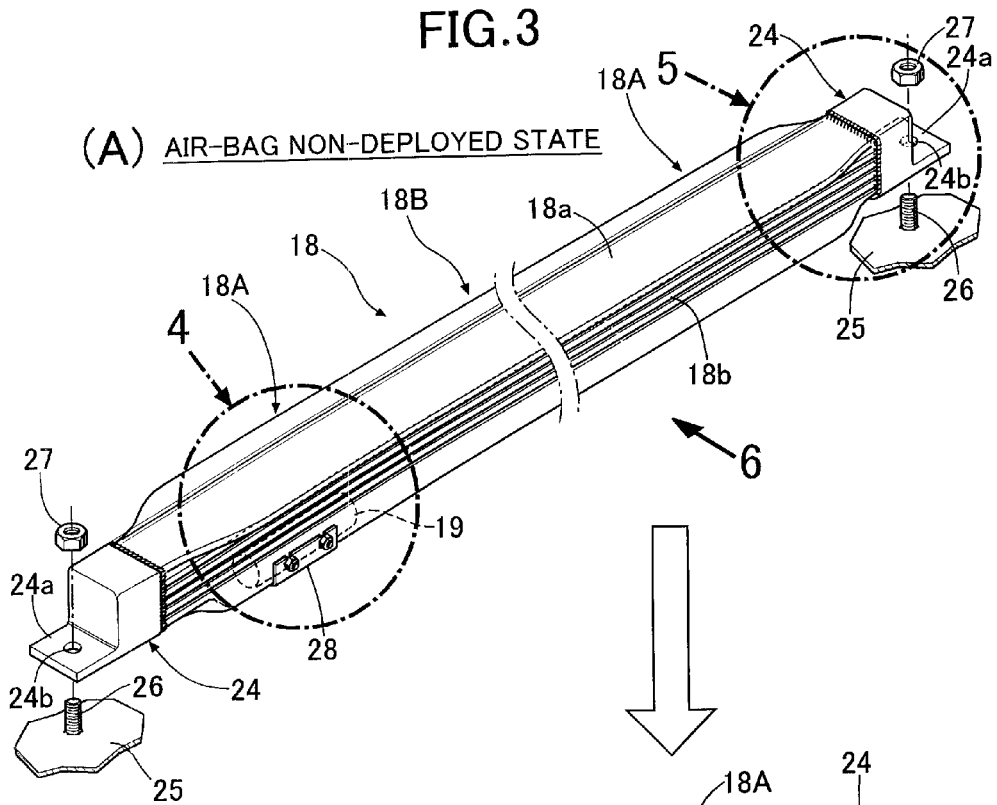
(A) AIR-BAG NON-DEPLOYED STATE
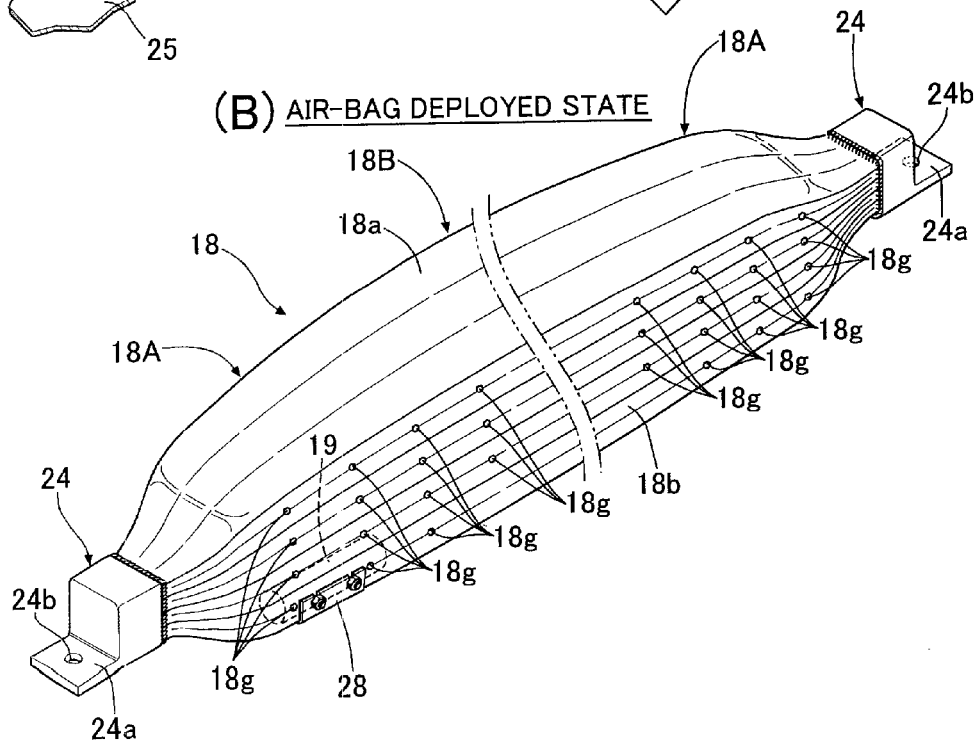
(B) AIR-BAG DEPLOYED STATE

FIG.7
(A)
FIRST LINE TO THIRD LINE
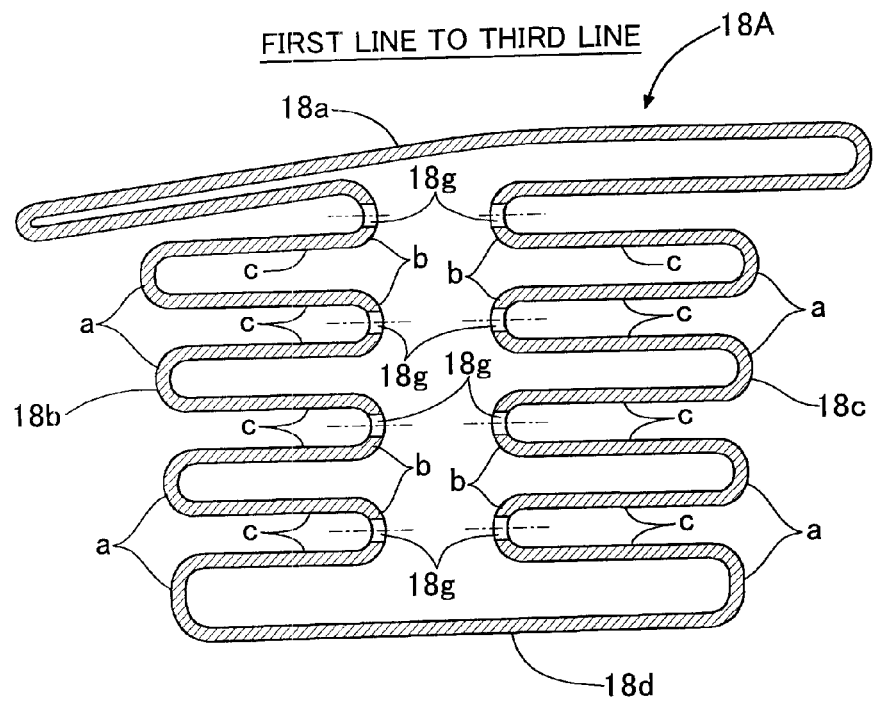
(B)
FOURTH LINE
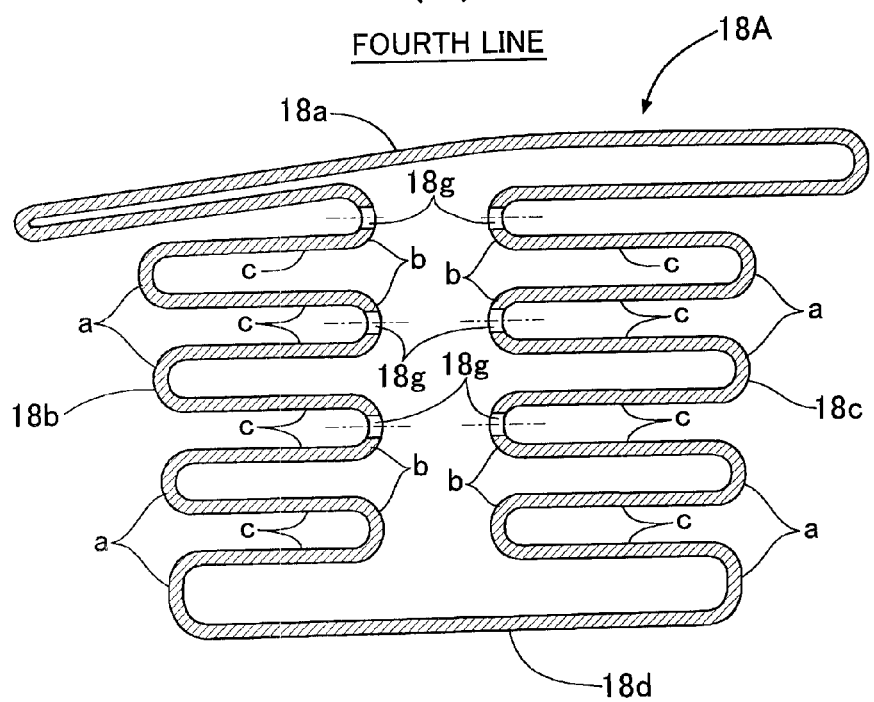

FIG.10
(A)
FIRST LINE TO FOURTH LINE
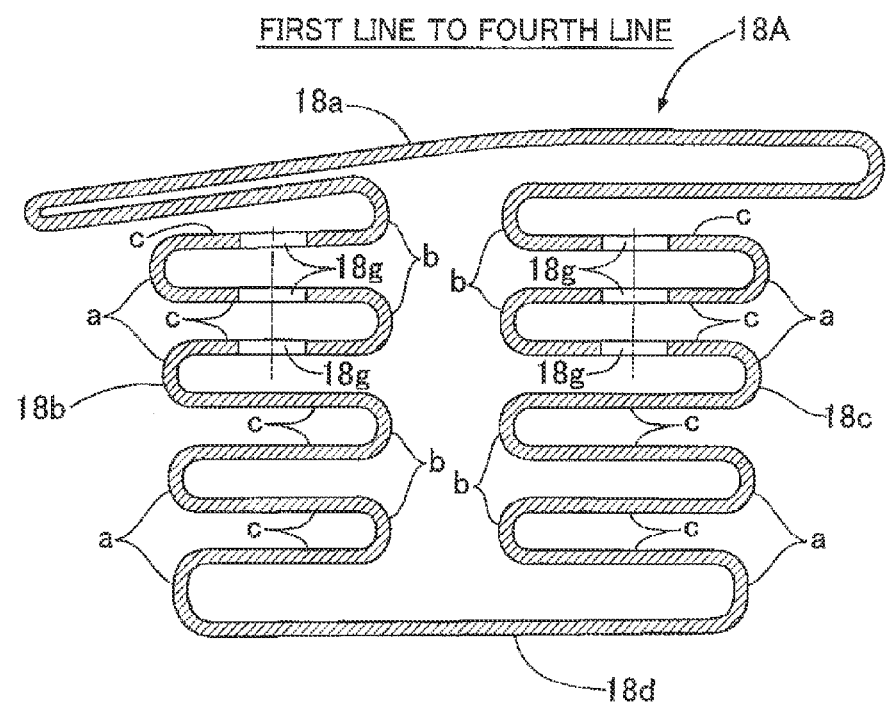
(B)
FIFTH LINE
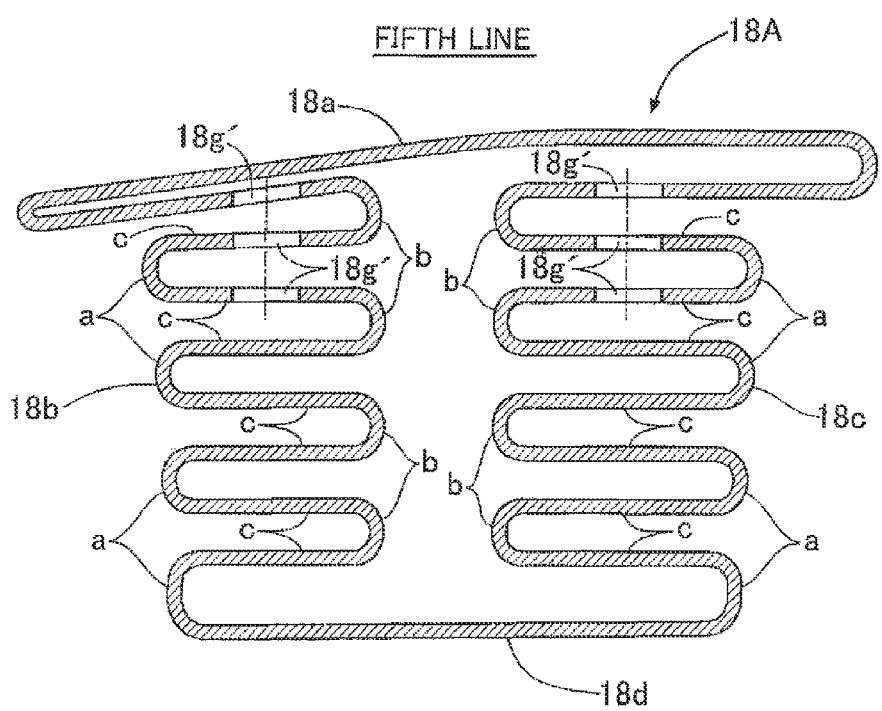

FIG.12
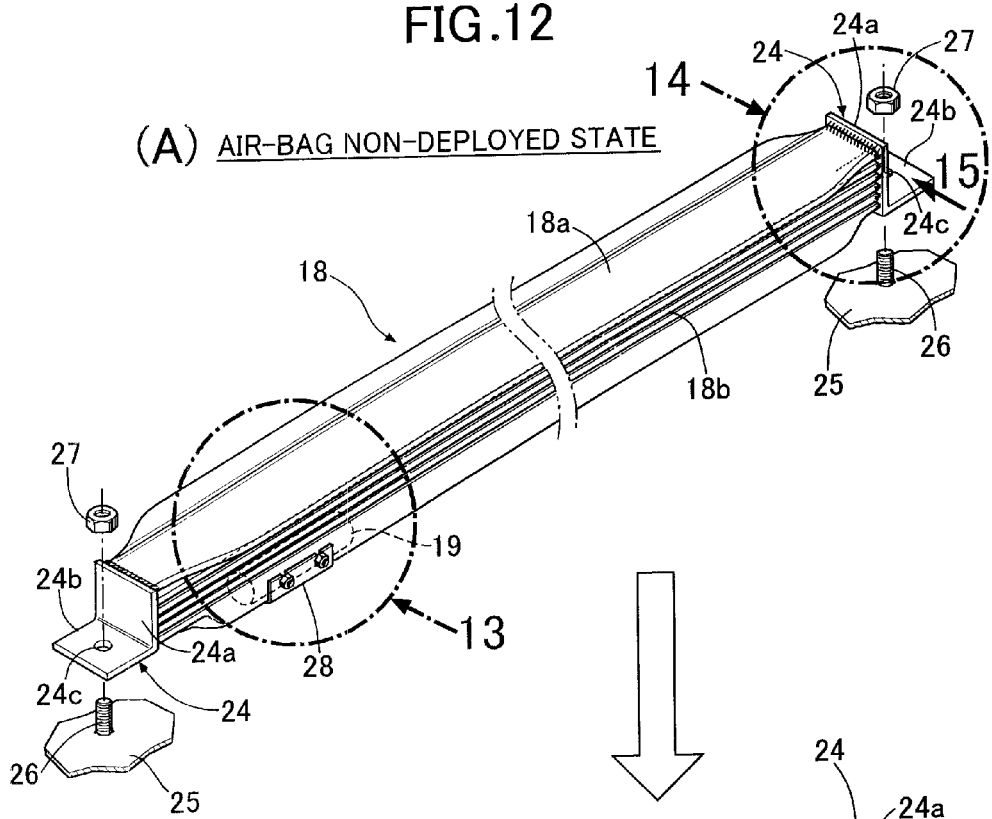
(A) AIR-BAG NON-DEPLOYED STATE
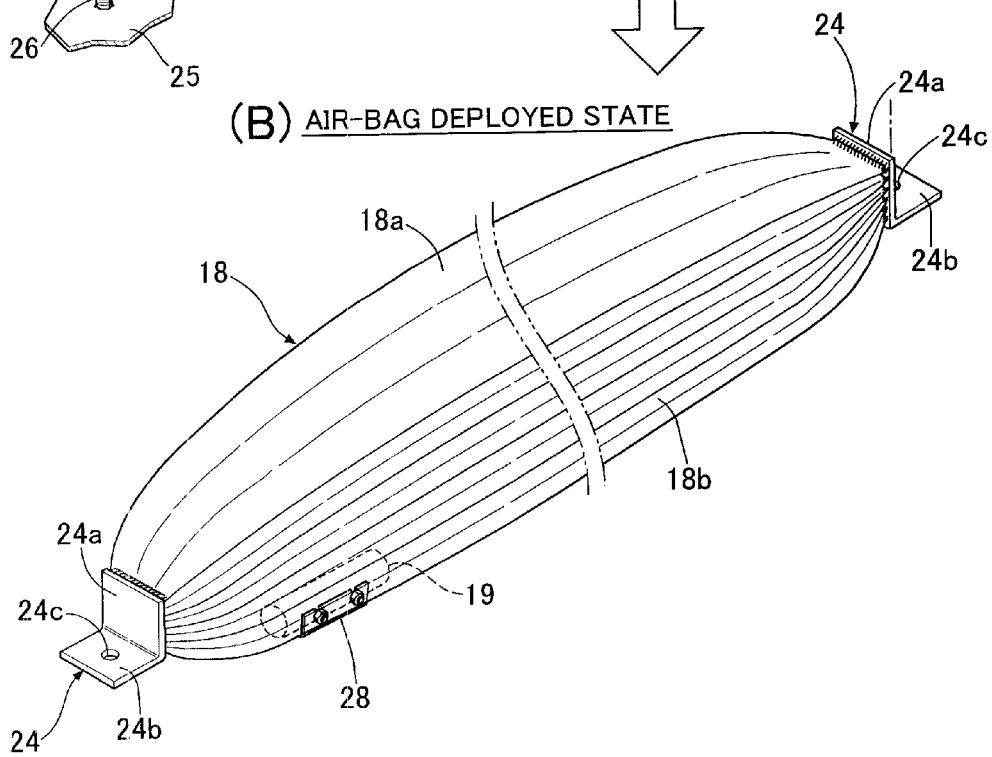
(B) AIR-BAG DEPLOYED STATE FIG.15
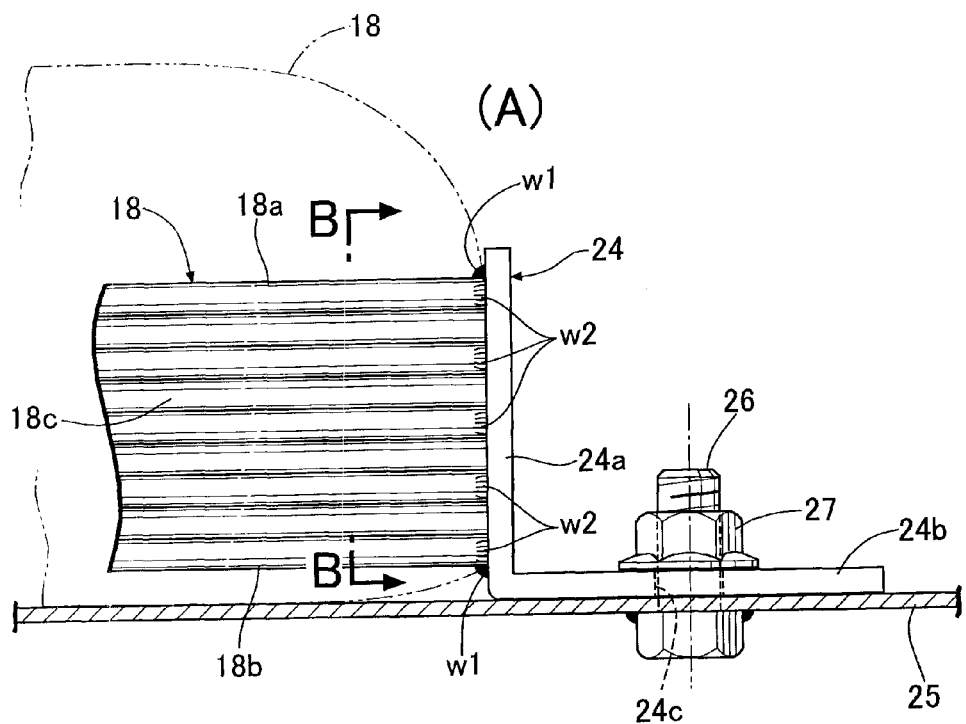
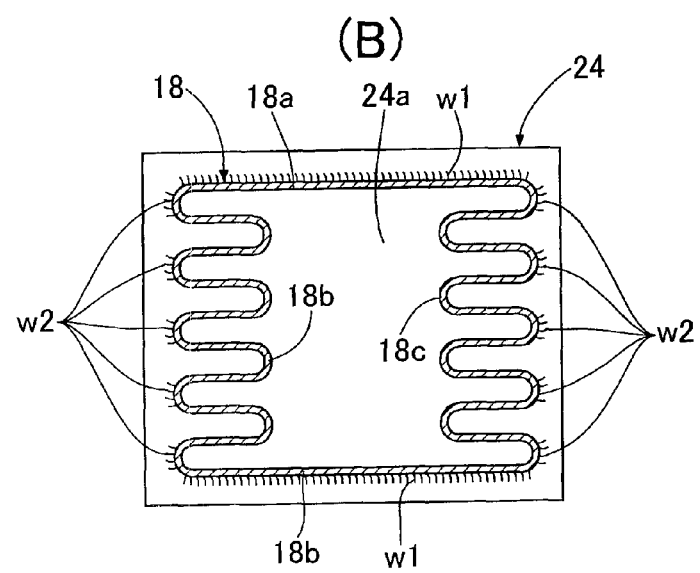

FIG.20
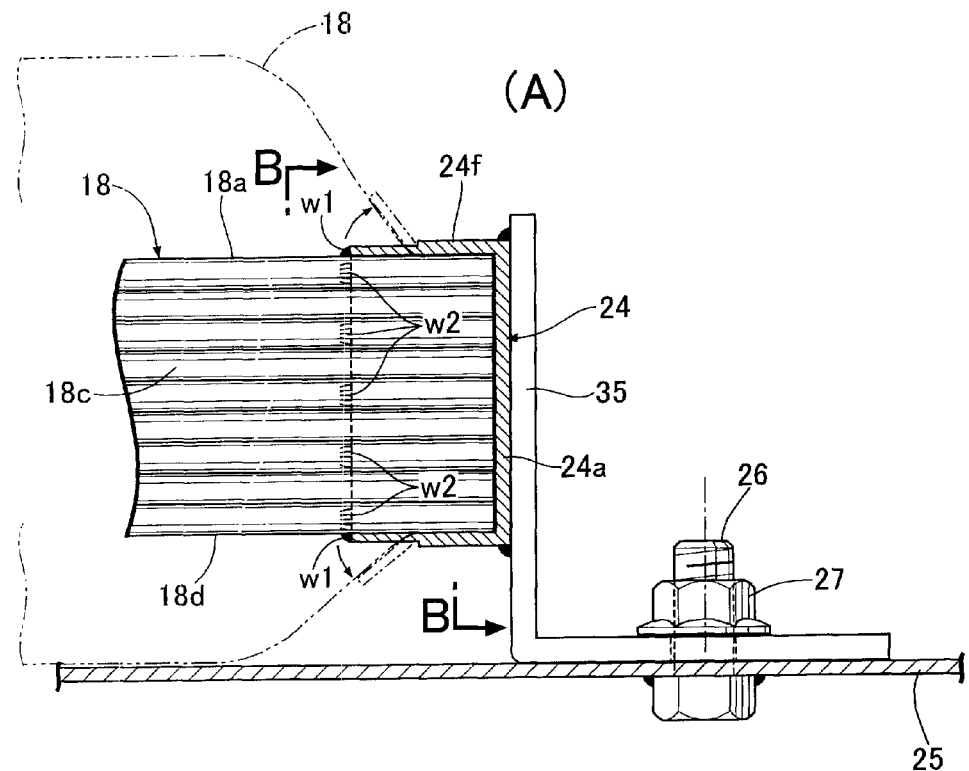
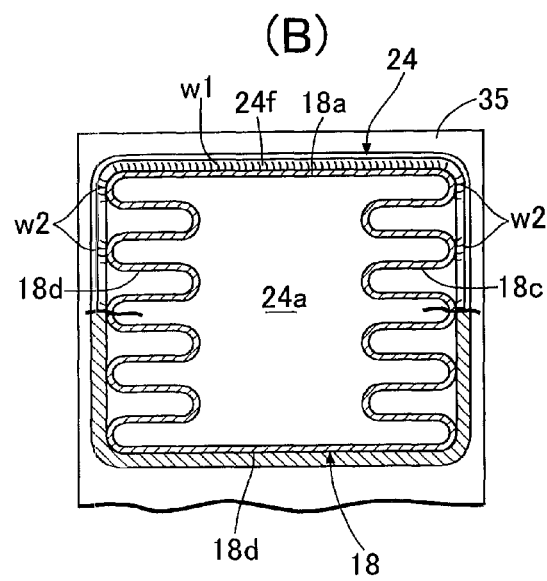

FIG.21
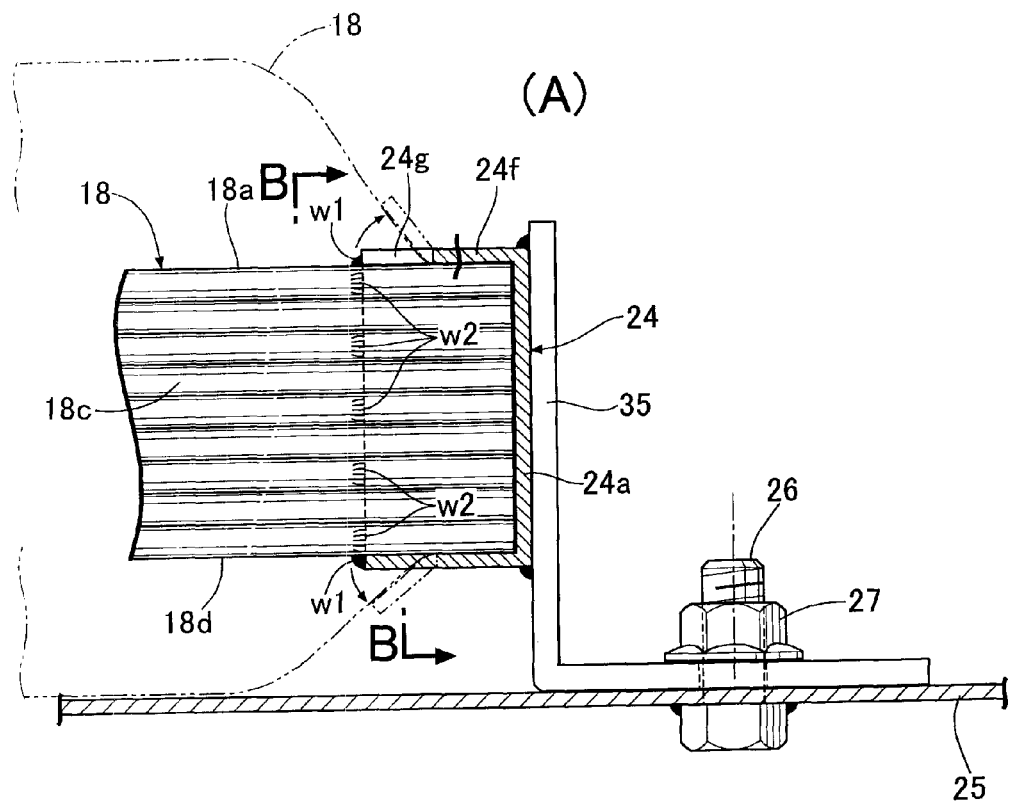
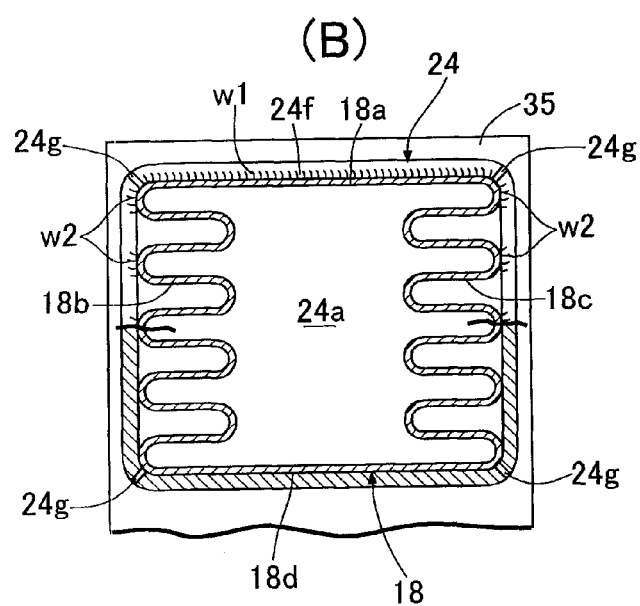

FIG.22
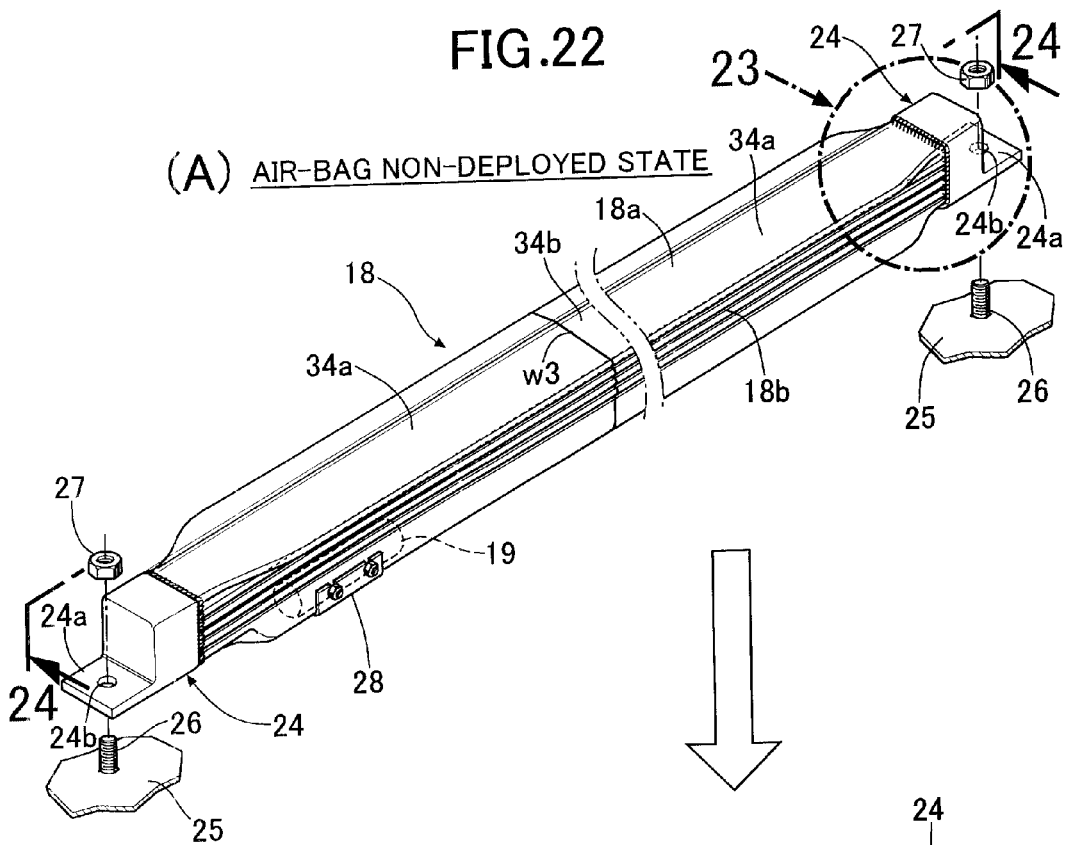
(A) AIR-BAG NON-DEPLOYED STATE
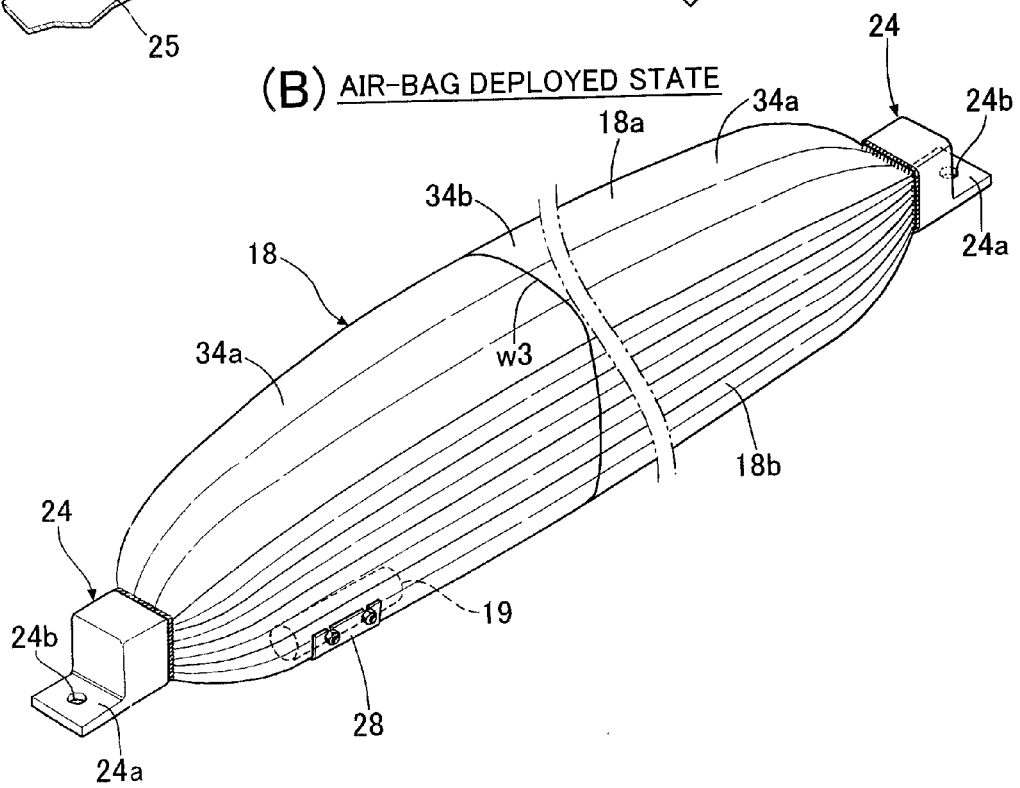
(B) AIR-BAG DEPLOYED STATE FIG.25
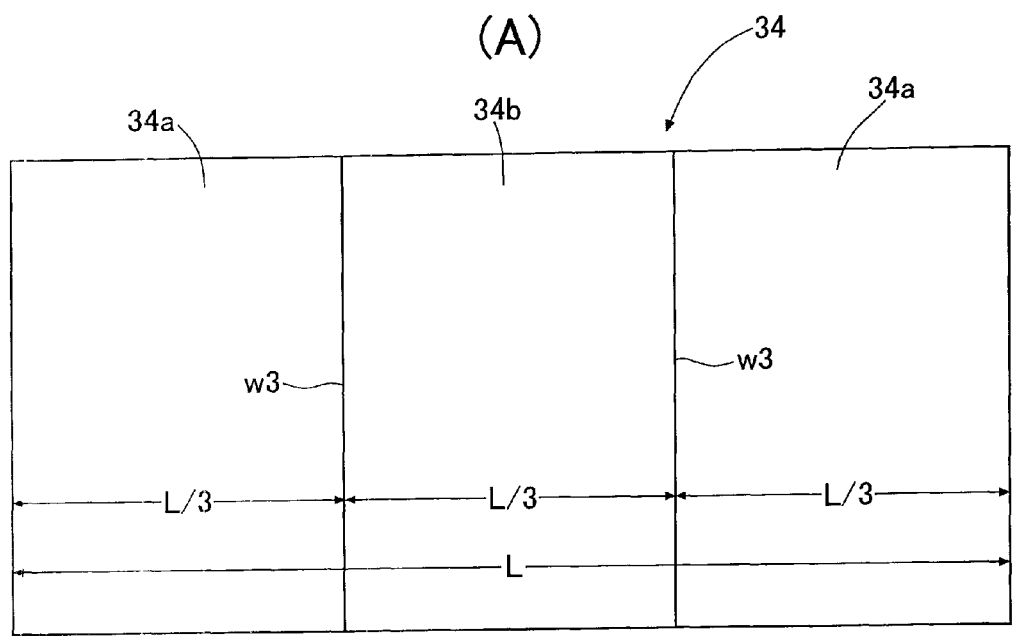
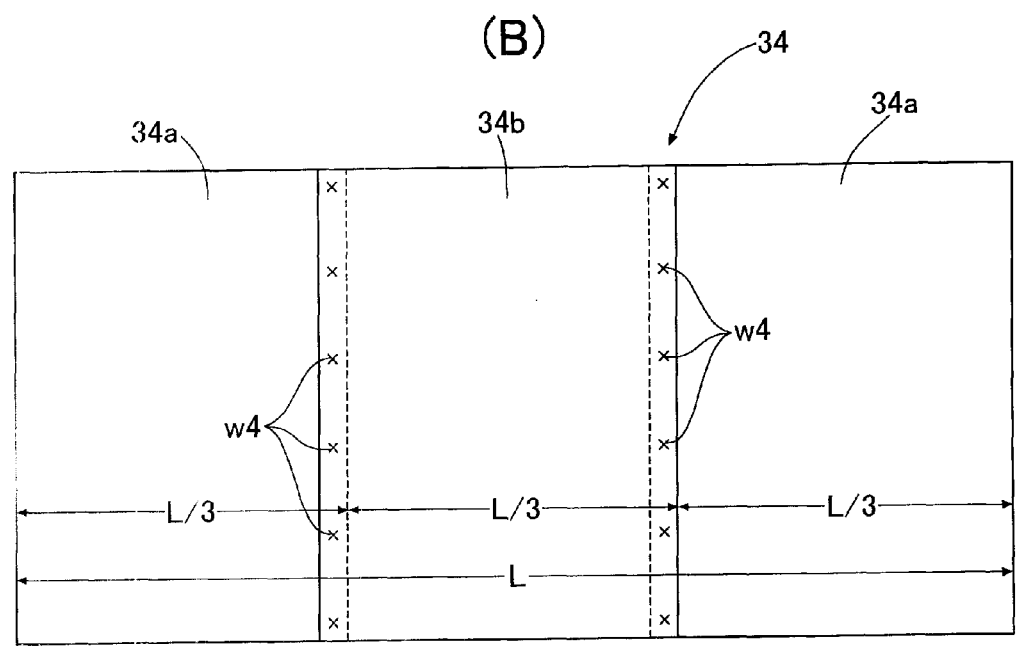

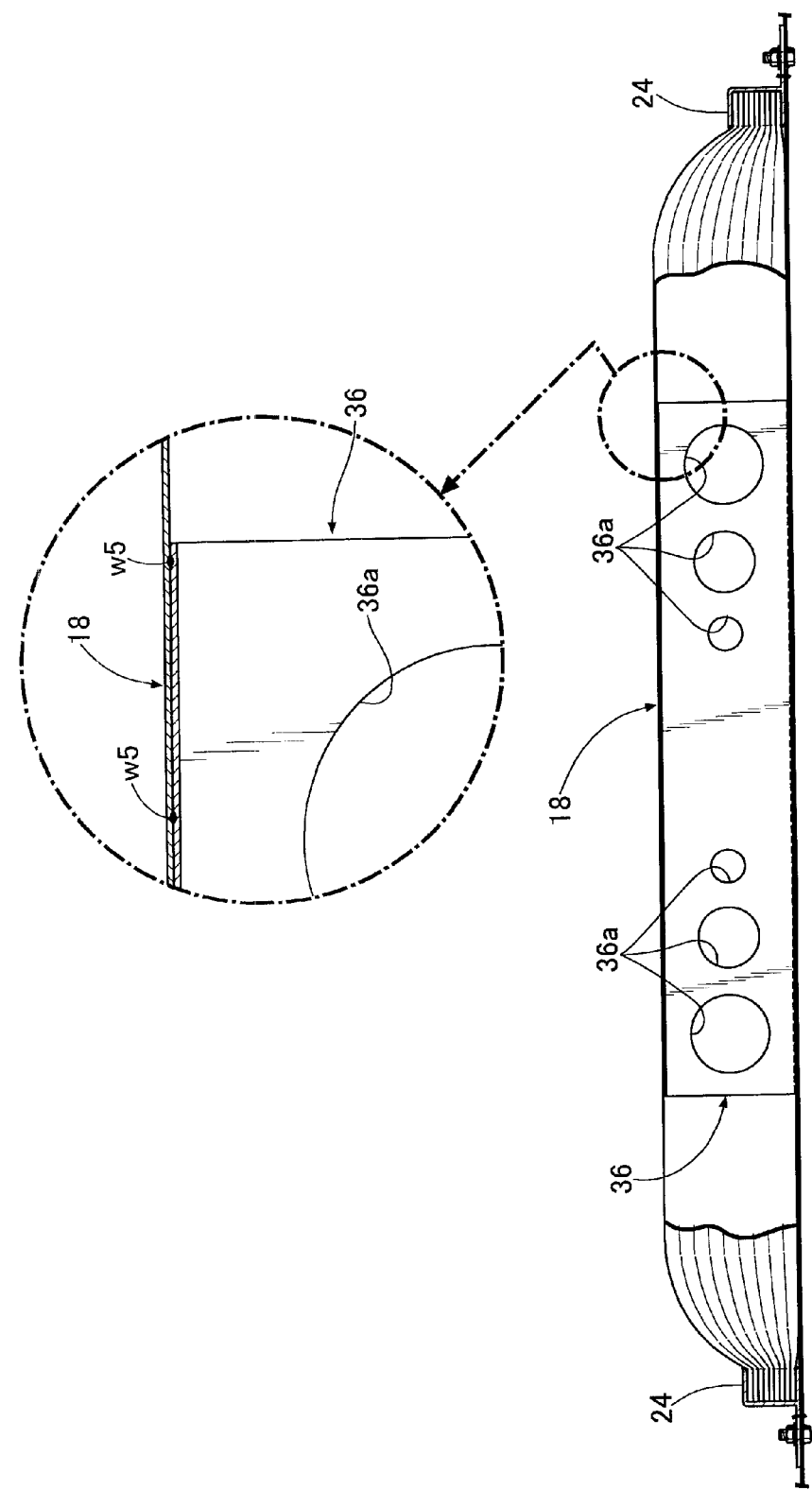

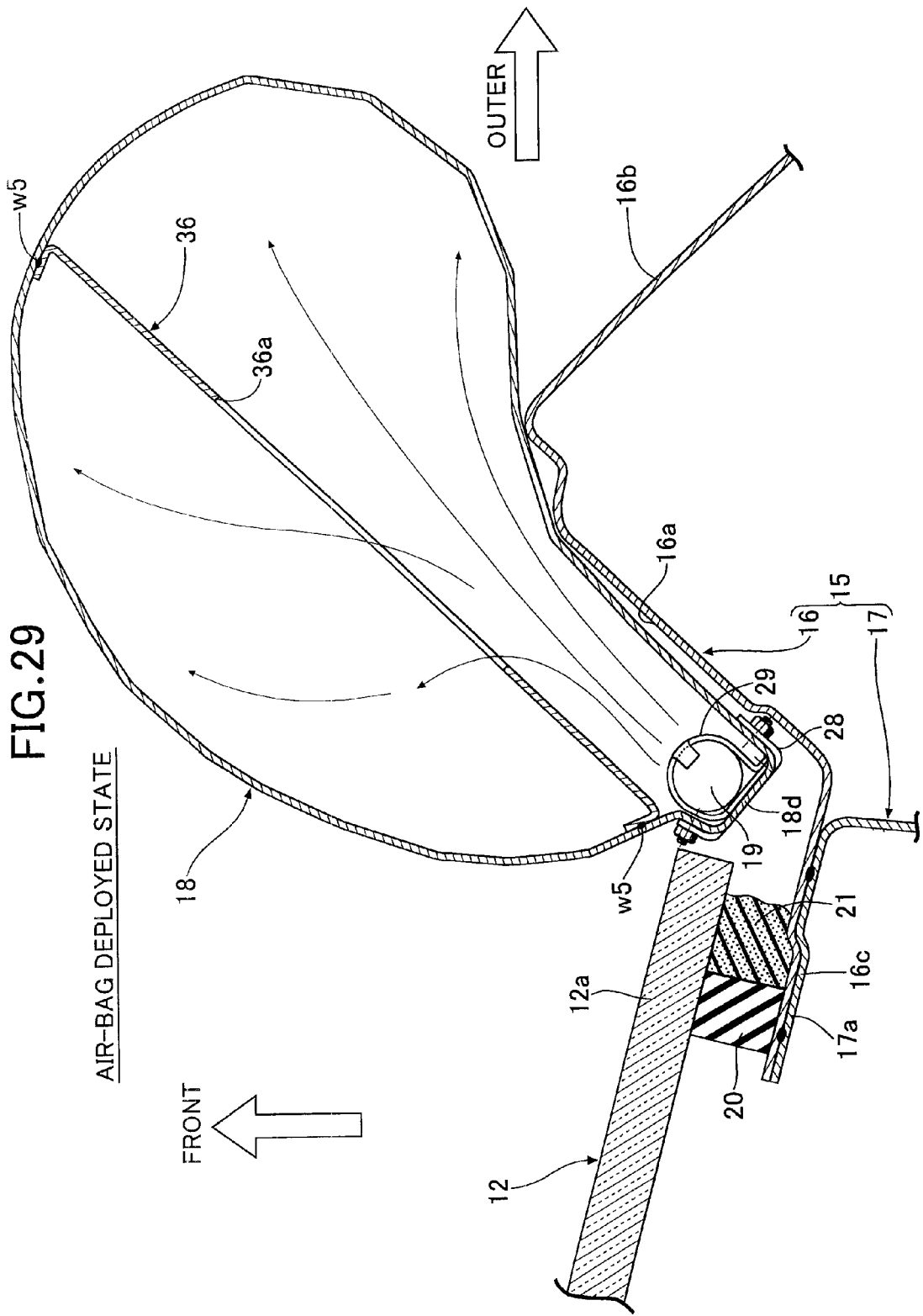

AIR-BAG DEVICE

TECHNICAL FIELD

The present invention relates to an air-bag device for protecting a pedestrian by deploying a tube-shaped air-bag with a gas generated by an inflator, the tube-shaped air-bag being formed by folding a metal sheet, and the tube-shaped air-bag having longitudinally opposite ends blocked by a blocking member, the deployed air-bag having a complete deployment portion positioned on the longitudinally central side and having a substantially constant diameter and incomplete deployment portions positioned on longitudinally opposite end sides and having a diameter that gradually decreases in going toward the blocking member.

BACKGROUND ART

A pedestrian-protecting air-bag device that houses a folded fabric air-bag inside a pillar garnish covering a front face of a front pillar of an automobile and protects a pedestrian by deploying the air-bag from a gap formed by breakage of the pillar garnish along the front face of the front pillar by supplying a gas generated by an inflator to the air-bag at the time of a collision with a pedestrian is known from Patent Document 1 below.

Furthermore, a pedestrian protection impact absorbing structure in which a pillar garnish covering a front face of a front pillar of an automobile is supported on a pillar skeleton member via a link type pillar drive mechanism, and at the time of a collision with a pedestrian the pillar garnish is lifted from the pillar skeleton member by the pillar drive mechanism so as to enable the pillar garnish to travel to thus absorb the energy of the collision is known from Patent Document 2 below.

Patent Document 1: Japanese Patent Application Laid-open No. 2002-283939
Patent Document 2: Japanese Patent Application Laid-open No. 2006-282105

DISCLOSURE OF INVENTION

Problems to be Solved by the Invention

However, since the invention described in Patent Document 1 above employs a fabric air-bag, it is difficult to maintain the deployed state over a long period of time, and there is a possibility that, depending on the timing of a pedestrian colliding with the front pillar, a sufficient impact absorbing effect will not be exhibited.

Furthermore, the invention described in Patent Document 2 above has the problem that since the structure of the link type pillar drive mechanism movably supporting the pillar garnish on the pillar skeleton member is complicated, the number of components increases, thus causing an increase in cost.

The present inventors have already proposed an arrangement in Japanese Patent Application No. 2009-224380 in which a zigzag-folded metal air-bag is disposed between a front windshield and a front pillar, and at the time of a collision with a pedestrian the air-bag is deployed into a tube shape along the front pillar.

However, in the arrangement proposed by Japanese Patent Application No. 2009-224380 above, since longitudinally opposite end portions of the folded air-bag are fixed by being press-fitted into an opening of an end cap, in contrast to a longitudinally central portion of the air-bag that is deployed into a cylindrical shape with a substantially constant diameter (complete deployment portion), the longitudinally opposite end portions of the air-bag are deployed into a cone shape such that the diameter gradually decreases toward the end cap (incomplete deployment portion), and there is therefore a possibility that the folded state of the incomplete deployment portion will not be fully released and will have high rigidity, and the impact absorption performance when there is a collision with a pedestrian will be degraded.

The present invention has been accomplished in light of the above-mentioned circumstances, and it is an object thereof to ensure uniform impact absorption performance over the entire longitudinal length of a metal air-bag for protecting a pedestrian by lowering the rigidity of incomplete deployment portions at longitudinally opposite end sides of the air-bag by utilizing a vent hole.

Means for Solving the Problems

In order to attain the above object, according to a first aspect of the present invention, there is provided an air-bag device for protecting a pedestrian by deploying a tube-shaped air-bag with a gas generated by an inflator, the tube-shaped air-bag being formed by folding a metal sheet, and the tube-shaped air-bag having longitudinally opposite ends blocked by a blocking member, the deployed air-bag having a complete deployment portion positioned on the longitudinally central side and having a substantially constant diameter and incomplete deployment portions positioned on longitudinally opposite end sides and having a diameter that gradually decreases in going toward the blocking member, wherein the air-bag comprises a plurality of vent holes formed in a valley portion or main portion of the fold of the incomplete deployment portion.

Further, according to a second aspect of the present invention, in addition to the first aspect, the vent holes are disposed at a fixed pitch in the longitudinal direction and the circumferential direction of the air-bag.

Furthermore, according to a third aspect of the present invention, in addition to the first or second aspect, the vent holes are formed in the main portion of the fold.

Moreover, according to a fourth aspect of the present invention, in addition to any one of the first to third aspects, the vent holes are disposed more on a front face side and less on a rear face side of the air-bag.

Further, according to a fifth aspect of the present invention, in addition to any one of the first to fourth aspects, the complete deployment portion comprises an auxiliary vent hole at a position adjacent to the incomplete deployment portion.

Furthermore, according to a sixth aspect of the present invention, in addition to the fifth aspect, the auxiliary vent hole is disposed so as to be biased further toward the front face side of the air-bag than the vent holes are.

Moreover, according to a seventh aspect of the present invention, in addition to any one of the first to sixth aspects, the number of the vent holes decreases in going closer to the complete deployment portion.

Further, according to an eighth aspect of the present invention, in addition to any one of the first to seventh aspects, opposite end parts of the folded air-bag are bendably welded with welds to the blocking member.

Furthermore, according to a ninth aspect of the present invention in addition to the eighth aspect, an end face of the opening of the air-bag is abutted against the blocking member and welded thereto with a weld.

Moreover, according to a tenth aspect of the present invention, in addition to the eighth or ninth aspect, the blocking member is folded in a zigzag manner.

Further, according to an eleventh aspect of the present invention, in addition to the tenth aspect, the blocking member is formed into a squared U shape so as to comprise a blocking portion welded with a weld to the end face of the opening and a pair of side wall portions bent from the blocking portion so as to cover side faces of the air-bag.

Furthermore, according to a twelfth aspect of the present invention, in addition to the eighth aspect, the blocking member is formed into a cap shape so as to comprise a blocking portion abutted against the end face of the opening and a tubular portion bent from the periphery of the blocking portion so as to cover the entire periphery of the side face of the air-bag and welded with a weld to the side face, and the tubular portion is deformable by means of pressure from the deploying air-bag.

Moreover, according to a thirteenth aspect of the present invention, in addition to the twelfth aspect, the tubular portion comprises an expandable slit.

Further, according to a fourteenth aspect of the present invention, in addition to any one of the eighth to thirteenth aspects, the blocking member is fixed to a vehicle body via a deformable stay.

Furthermore, according to a fifteenth aspect of the present invention, in addition to any one of the first to seventh aspects, with regard to the air-bag, the sheet thickness of the longitudinally opposite end portions is thinner than the sheet thickness of the longitudinally central portion.

Moreover, according to a sixteenth aspect of the present invention, in addition to the fifteenth aspect, the sheet thickness of the longitudinally central portion of the air-bag is at least 0.7 mm.

Further, according to a seventeenth aspect of the present invention, in addition to the fifteenth or sixteenth aspect, the difference between the sheet thickness of the longitudinally opposite end portions of the air-bag and the sheet thickness of the longitudinally central portion is 0.2 mm to 0.3 mm.

Furthermore, according to an eighteenth aspect of the present invention, in addition to any one of the fifteenth to seventeenth aspects, with regard to a blank material forming the air-bag, the longitudinally opposite end portions and the longitudinally central portion, which have different sheet thicknesses, are joined via a tailored blank weld.

Moreover, according to a nineteenth aspect of the present invention, in addition to any one of the fifteenth to eighteenth aspects, with regard to a blank material forming the air-bag, the longitudinally opposite end portions and the longitudinally central portion, which have different sheet thicknesses, are superimposed and joined via a spot weld.

Further, according to a twentieth aspect of the present invention, in addition to any one of the fifteenth to nineteenth aspects, with regard to the blank material, the length of the longitudinally opposite end portions is substantially equal to the length of the longitudinally central portion.

Furthermore, according to a twenty-first aspect of the present invention, in addition to any one of the first to seventh aspects, inner faces of the longitudinally central portion of the air-bag are connected via a reinforcing member formed from a metal sheet.

Moreover, according to a twenty-second aspect of the present invention, in addition to the twenty-first aspect, the reinforcing member is housed in the interior of the air-bag in a zigzag manner.

Further, according to a twenty-third aspect of the present invention, in addition to the twenty-first or twenty-second aspect, the air-bag has a sheet thickness of 0.4 mm to 0.5 mm.

Furthermore, according to a twenty-fourth aspect of the present invention, in addition to any one of the twenty-first to twenty-third aspects, the reinforcing member comprises a cutout hole at least on a side toward longitudinally opposite end portions of the air-bag.

Moreover, according to a twenty-fifth aspect of the present invention, in addition to the twenty-fourth aspect, a plurality of the cutout holes are formed, the closer the cutout hole is to longitudinally opposite end portions of the air-bag, the larger the diameter thereof.

A garnish portion 18a of an embodiment corresponds to the front face of the air-bag of the present invention, an inflator support portion 18d of the embodiment corresponds to the rear face of the air-bag of the present invention, and an end cap 24 of the embodiment corresponds to the blocking member of the present invention.

Effects of the Invention

In accordance with the first aspect of the present invention, the tube-shaped air-bag, which is formed by folding the metal sheet and has the longitudinally opposite ends blocked by the blocking member, does not deflate once it has been deployed, the impact of a pedestrian is absorbed by plastic deformation of the metal, and it is therefore possible not only to reduce the weight and cost by employing a low capacity inflator but also for stable impact absorption performance to be exhibited regardless of lag in the timing of a collision with a pedestrian.

The deployed air-bag has the complete deployment portion, which is positioned on the longitudinally central side and has a substantially constant diameter, and the incomplete deployment portions, which are positioned on the longitudinally opposite end sides and have a diameter that gradually decreases in going toward the blocking member; the incomplete deployment portion has high rigidity compared with the complete deployment portion and is difficult to deform when there is a collision with a pedestrian, thus degrading the impact absorption performance, but disposing the plurality of vent holes in the incomplete deployment portion enables the rigidity of the incomplete deployment portion to be lowered and the impact absorption performance to be enhanced, thereby giving uniform impact absorption performance over the entire longitudinal length of the air-bag.

Moreover, since the vent holes are formed in the valley portion or main portion of the fold of the incomplete deployment portion, it is possible to make it difficult for the vent hole to open at the initial stage of deployment, thus enabling rapid deployment of the air-bag.

Furthermore, in accordance with the second aspect of the present invention, since the vent holes are disposed at a fixed pitch in the longitudinal direction and the circumferential direction of the air-bag, the degree of freedom in setting the impact absorption performance is improved.

Moreover, in accordance with the third aspect of the present invention, since the vent holes of the incomplete deployment portion are formed in a main portion of the fold, it is possible to make it difficult for the vent holes to open in the initial stage of deployment of the air-bag to thus enhance the deployment performance and for the function of decreasing the rigidity of the incomplete deployment portion by means of the vent holes to be exhibited effectively.

Furthermore, in accordance with the fourth aspect of the present invention, since more of the vent holes of the incomplete deployment portion are disposed on the front face side of the air-bag, to which the impact of a collision with a pedestrian is inputted, it is possible for the function of decreasing the rigidity of the incomplete deployment portion by means of the vent holes to be exhibited more effectively.

Moreover, in accordance with the fifth aspect of the present invention, since the complete deployment portion of the air-bag includes an auxiliary vent hole at a position adjacent to the incomplete deployment portion, when the incomplete deployment portion is deformed as a result of a collision with a pedestrian the rigidity of the incomplete deployment portion can be further decreased effectively by making the deformation be easily transmitted to the complete deployment portion.

Furthermore, in accordance with the sixth aspect of the present invention, since the auxiliary vent hole of the complete deployment portion is disposed so as to be biased toward the front face side of the air-bag, to which the impact of a collision is inputted, rather than toward the vent hole of the incomplete deployment portion, it is possible to further decrease the rigidity of the incomplete deployment portion effectively.

Moreover, in accordance with the seventh aspect of the present invention, since the number of vent holes of the incomplete deployment portion decreases in going closer to the complete deployment portion, which easily deforms at the time of a collision with a pedestrian, it is possible for uniform impact absorption performance over the entire longitudinal length of the air-bag to be exhibited.

Furthermore, in accordance with the eighth aspect of the present invention, since the opposite end parts of the folded air-bag are bendably welded to the blocking member, bending the opposite end parts of the air-bag radially outward at the time of deployment enables the opposite end parts to be fully deployed, thus enhancing the impact absorption performance.

Moreover, in accordance with the ninth aspect of the present invention, since the end face of the opening of the air-bag is abutted against the blocking member and welded thereto, it is possible to easily bend the air-bag radially outward via the abutted and welded portion, thus enabling it to be reliably deployed.

Furthermore, in accordance with the tenth aspect of the present invention, since the blocking member is folded in a zigzag manner, the blocking member expands into a flat shape at the time of deployment of the air-bag, thus enabling the opposite end parts of the air-bag to be more reliably deployed.

Moreover, in accordance with the eleventh aspect of the present invention, since the blocking member is formed into a squared U shape while including the blocking portion welded to the end face of the opening and the pair of side wall portions bent from the blocking portion so as to cover the side faces of the air-bag, it is possible to provide a seal for gas leaking from between the opening of the air-bag and the blocking portion of the blocking member by means of the side wall portions.

Furthermore, in accordance with the twelfth aspect of the present invention, since the blocking member is formed into a cap shape while including the blocking portion abutted against the end face of the opening and the tubular portion bent from the outer periphery of the blocking portion so as to cover the entire periphery of the side face of the air-bag and welded to the side face, it is possible to easily bend the opposite end parts of the air-bag radially outward and reliably deploy it by deforming the tubular portion of the blocking member by means of the pressure of the deploying air-bag.

Moreover, in accordance with the thirteenth aspect of the present invention, since the tubular portion includes the expandable slit, it is possible to more easily bend the opposite end parts of the air-bag radially outward and reliably deploy it by expanding the slit of the side wall portion by means of the pressure of the deploying air-bag.

Furthermore, in accordance with the fourteenth aspect of the present invention, since the blocking member is fixed to a vehicle body via a deformable stay, the stay deforms at the time of deployment of the air-bag and the blocking member moves in a direction away from the vehicle body, thus making it possible to more reliably deploy the opposite end parts of the air-bag.

Moreover, in accordance with the fifteenth aspect of the present invention, since the sheet thickness of the longitudinally opposite end portions of the air-bag, for which there is a possibility that due to difficulty in deployment the rigidity will be high and the impact absorption performance will be degraded, is thinner than the sheet thickness of the longitudinally central portion, which is easy to deploy, it is possible to ensure uniform impact absorption performance over the entire length of the air-bag by lowering the rigidity of the longitudinally opposite end portions while maintaining the rigidity of the longitudinally central portion.

Furthermore, in accordance with the sixteenth aspect of the present invention, since the sheet thickness of the longitudinally central portion of the air-bag is at least 0.7 mm, it is possible to ensure the rigidity of the longitudinally central portion, thus avoiding bottoming out when there is a collision with a pedestrian.

Moreover, in accordance with the seventeenth aspect of the present invention, since the difference between the sheet thickness of the longitudinally opposite end portions of the air-bag and the sheet thickness of the longitudinally central portion is 0.2 mm to 0.3 mm, it is possible to ensure uniform impact absorption performance over the entire length of the air-bag.

Furthermore, in accordance with the eighteenth aspect of the present invention, since the blank material forming the air-bag employs one in which the longitudinally opposite end portions and the longitudinally central portion, which have different sheet thicknesses, are joined by tailored blank welding, the blank material can be obtained at low cost.

Moreover, in accordance with the nineteenth aspect of the present invention, since the blank material forming the air-bag employs one in which the longitudinally opposite end portions and the longitudinally central portion, which have different sheet thicknesses, are superimposed and joined by spot welding, not only can the blank material be obtained at low cost, but it is also possible to utilize a gap between adjacent spot-welded parts as a vent hole.

Furthermore, in accordance with the twentieth aspect of the present invention, since the length of the longitudinally opposite end portions of the air-bag is substantially equal to the length of the longitudinally central portion, it is possible to simplify the structure of the blank material and reduce the cost.

Moreover, in accordance with the twenty first aspect of the present invention, since the inner faces of the longitudinally central portion of the air-bag are connected via the reinforcing member formed from the metal sheet, it is possible to ensure uniform impact absorption performance over the entire longitudinal length of the air-bag by enhancing the rigidity by reinforcing the longitudinally central portion of the air-bag by means of the reinforcing member while enhancing the impact absorption performance by decreasing the sheet thickness of the air-bag to thus make it easy for the longitudinally opposite end portions to be deployed, and by enabling the deployment shape of the air-bag to be stabilized and bottoming out to be prevented.

Furthermore, in accordance with the twenty second aspect of the present invention, since the reinforcing member is housed in the interior of the air-bag in a zigzag manner, it is possible to prevent interference from the reinforcing member when folding the air-bag.

Moreover, in accordance with the twenty third aspect of the present invention, since the sheet thickness of the air-bag is 0.4 mm to 0.5 mm, it becomes possible to reliably deploy the longitudinally opposite end portions of the air-bag, which are difficult to deploy, and it is possible to ensure impact absorption performance after deployment by means of decreased rigidity due to a smaller sheet thickness.

Furthermore, in accordance with the twenty fourth aspect of the present invention, since the reinforcing member includes cutout holes at least on a side toward longitudinally opposite end portions of the air-bag, it is possible to prevent the strength of the air-bag from changing rapidly at the border between the longitudinally opposite end portions, which have no reinforcing member, and the longitudinally central portion, which has a reinforcing member, thus preventing breakage of the air-bag at the time of deployment and at the time of a collision with a pedestrian.

Moreover, in accordance with the twenty fifth aspect of the present invention, since, among the plurality of cutout holes, the closer to the longitudinally opposite end portions of the air-bag the larger the diameter of the cutout hole, it is possible to smoothly change the strength of the air-bag in going from the longitudinally opposite end portions to the longitudinally central portion.

BRIEF DESCRIPTION OF DRAWINGS

FIG. 3 is a perspective view of an air-bag. (first embodiment)

FIG. 7 is a sectional view along 7(A)-7(A) and line 7(B)-7(B) in FIG. 6. (first embodiment)

FIG. 10 is a sectional view along line 10(A)-10(A) and line 10(B)-10(B) in FIG. 9. (second embodiment)

FIG. 12 is a perspective view of an air-bag. (third embodiment)

FIG. 15 is an enlarged view from the direction of arrow 15 in FIG. 12. (third embodiment)

FIG. 20 is a view corresponding to FIG. 15 above. (seventh embodiment)

FIG. 21 is a view corresponding to FIG. 15 above. (eighth embodiment)

FIG. 22 is a perspective view of an air-bag. (ninth embodiment)

FIG. 25 is a diagram for explaining a method for producing a blank material. (ninth embodiment)

FIG. 28 is a sectional view along line 28-28 in FIG. 27. (tenth embodiment)

FIG. 29 is a diagram, corresponding to FIG. 2, for explaining the operation at the time of deployment of the air-bag. (tenth embodiment)

EXPLANATION OF REFERENCE NUMERALS AND SYMBOLS

15 Front pillar
18 Air-bag
18A Incomplete deployment portion
18B Complete deployment portion
18*a* Garnish portion (front face)
18*d* Inflator support portion (rear face)
18*g* Vent hole
18*g*' Auxiliary vent hole
19 Inflator
24 End cap (blocking member)
24*a* Blocking portion
24*d* Stay
24*e* Side wall portion
24*f* Tubular portion
24*g* Slit
34 Blank material
34*a* Longitudinally opposite end portions
34*b* Longitudinally central portion
36 Reinforcing member
36*a* Cutout hole
b Valley portion
c Main portion
w1 Weld
w2 Weld
w3 Tailored blank weld
w4 Spot weld

BEST MODE FOR CARRYING OUT THE INVENTION

Modes for carrying out the present invention are explained below by reference to the attached drawings.

Embodiment 1

A first embodiment of the present invention is explained below by reference to FIG. 1 to FIG. 8.

Figure 1:
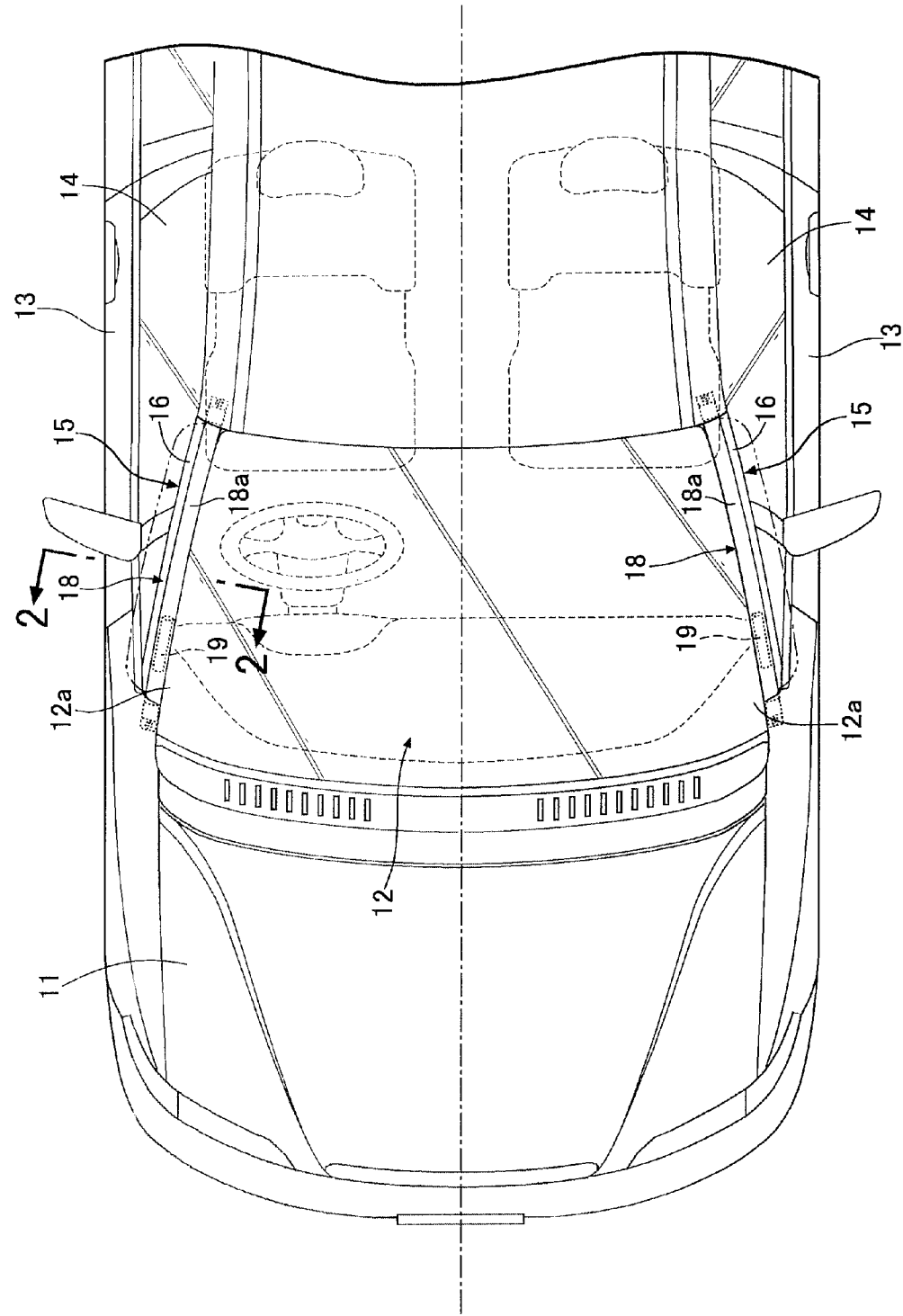
FIG. 1 is a plan view of a vehicle body front part of an automobile. (first embodiment)

As shown in FIG. 1, an automobile includes a front windshield 12 to the rear of a hood 11, and front pillars 15 and 15 are disposed so as to be held between left and right edge portions 12a and 12a of the front windshield 12 and door glass 14 and 14 of front doors 13 and 13.

Figure 2:
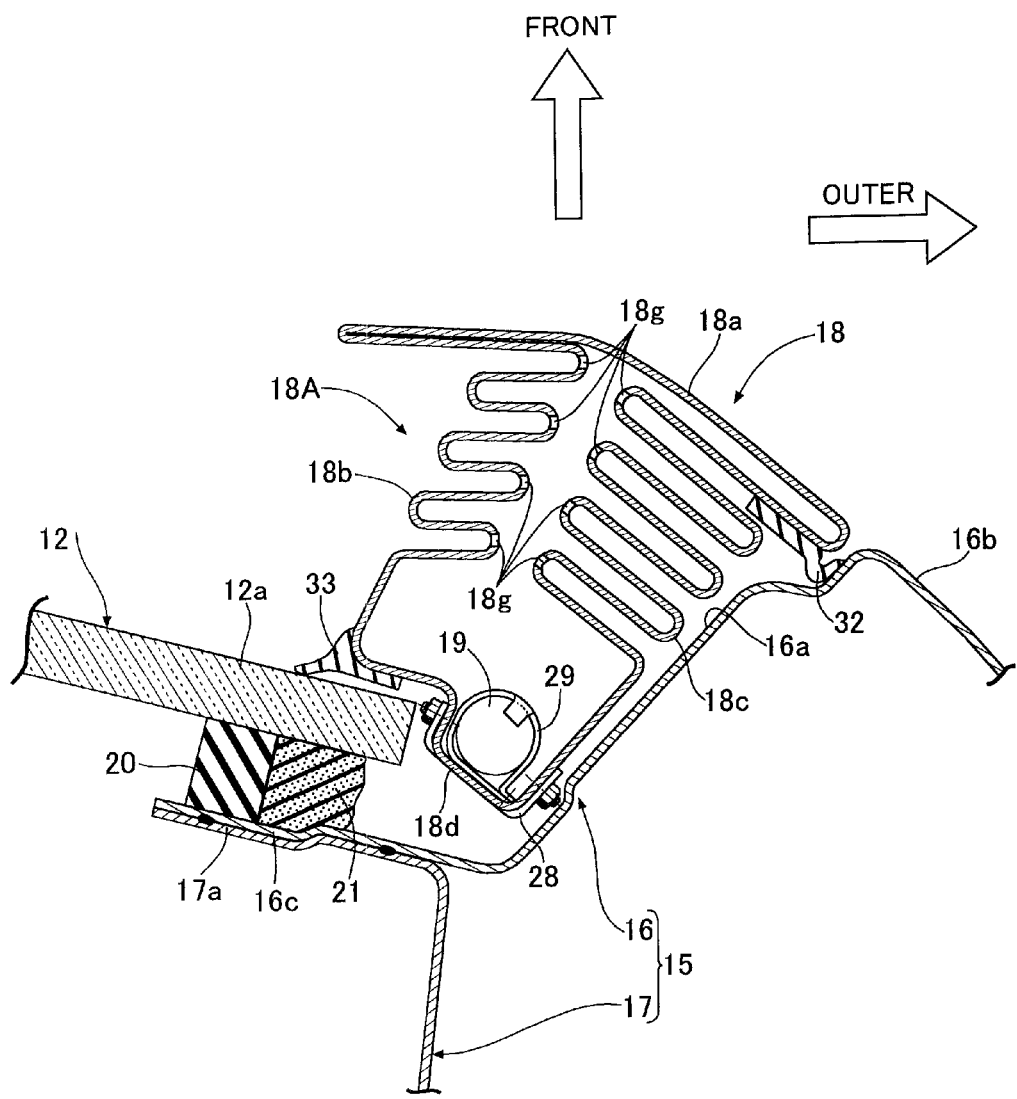
FIG. 2 is an enlarged sectional view along line 2-2 in FIG. 1. (first embodiment)

As shown in FIG. 2, the front pillar 15 is formed so as to have a closed cross section by joining an outer panel 16 positioned on the outside of a vehicle body and an inner panel 17 positioned on the inside of the vehicle body, and a metal air-bag 18 serving also as a pillar garnish is provided in a folded state on a side face 16a of the outer panel 16. The edge portion 12a of the front windshield 12 is superimposed on front faces of joining portions 16c and 17a of the outer panel 16 and the inner panel 17 via a dam rubber 20 and bonded by an adhesive 21.

The air-bag 18, which is formed from a folded metal tube, includes a garnish portion 18a, a windshield-side folded portion 18b, an outer panel-side folded portion 18c, and an inflator support portion 18d. The garnish portion 18a is smoothly continuous from an outer face 16b of the outer panel 16 of the front pillar 15 toward the front windshield 12, and exhibits a function as a pillar garnish disposed between the outer panel 16 and the front windshield 12.

The windshield-side folded portion 18b and the outer panel-side folded portion 18c are folded in a zigzag manner on the garnish portion 18a rear face side (rearward side) so as to ensure an allowance for expansion when the air-bag 18 is deployed.

Figure 5:
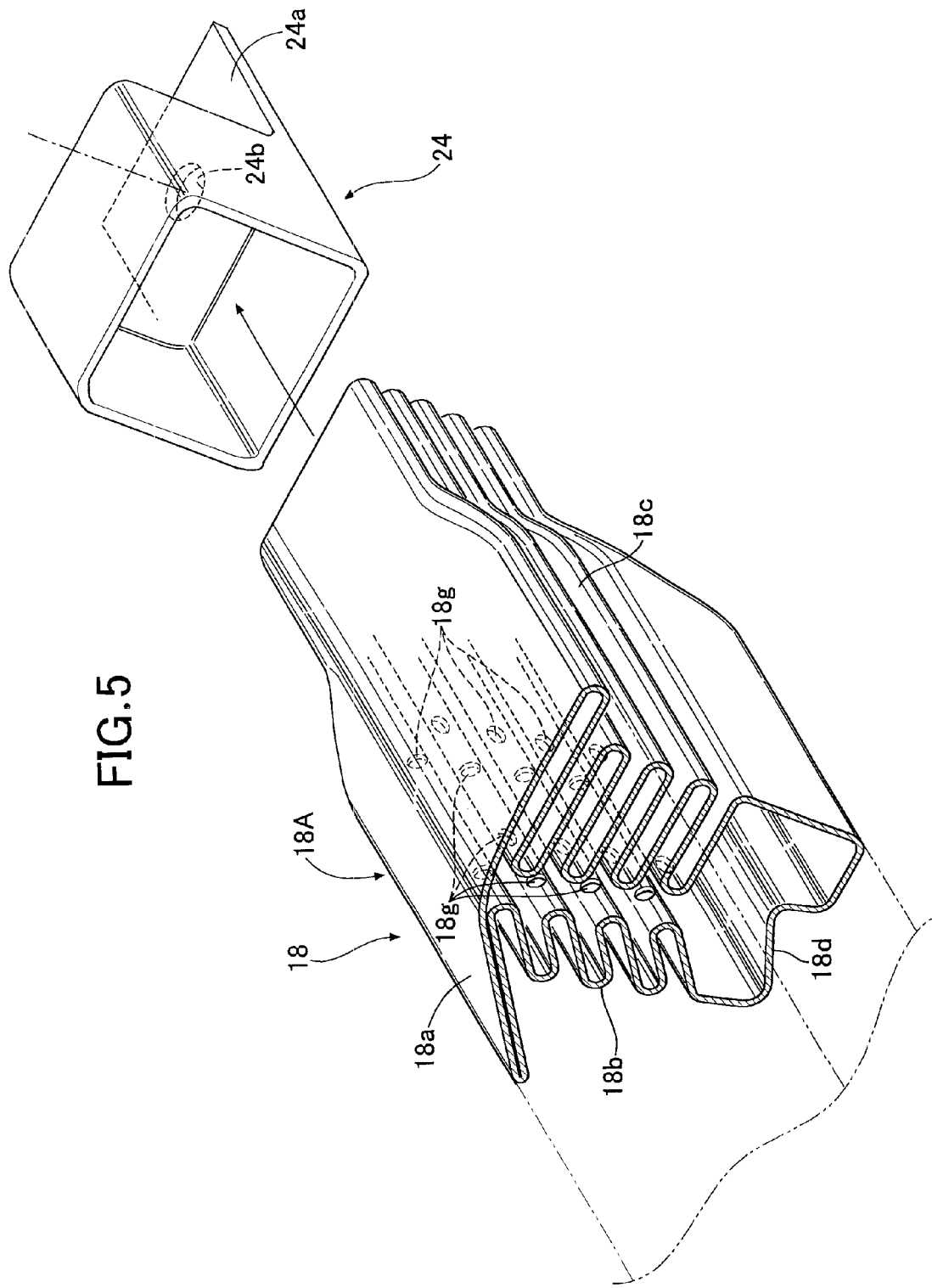
FIG. 5 is an enlarged perspective view of part 5 of FIG. 3. (first embodiment)

As is clear from FIG. 3 and FIG. 5, opposite end parts of the folded air-bag 18 are press formed with a taper, and fitting and welding end caps 24 and 24 thereto enables the opposite end parts of the air-bag 18 to be sealed. If a space for disposing the opposite end parts of the air-bag 18 can be ensured on the vehicle body side, it becomes unnecessary to press form the opposite end parts with a taper, and the ease of press forming improves. Each end cap 24 includes a mounting portion 24a, and the air-bag 18 is fixed along the front pillar 15 by screwing a nut 27 onto a bolt 26 extending through a bolt hole 24b of the fixed mounting portion 24a and a vehicle body panel 25.

Mounted on a lower end part of the inflator support portion 18d, which opposes the garnish portion 18a with the windshield-side folded portion 18b and the outer panel-side folded portion 18c sandwiched therebetween, is an inflator 19 for generating a gas for deploying the air-bag 18.

Figure 4:
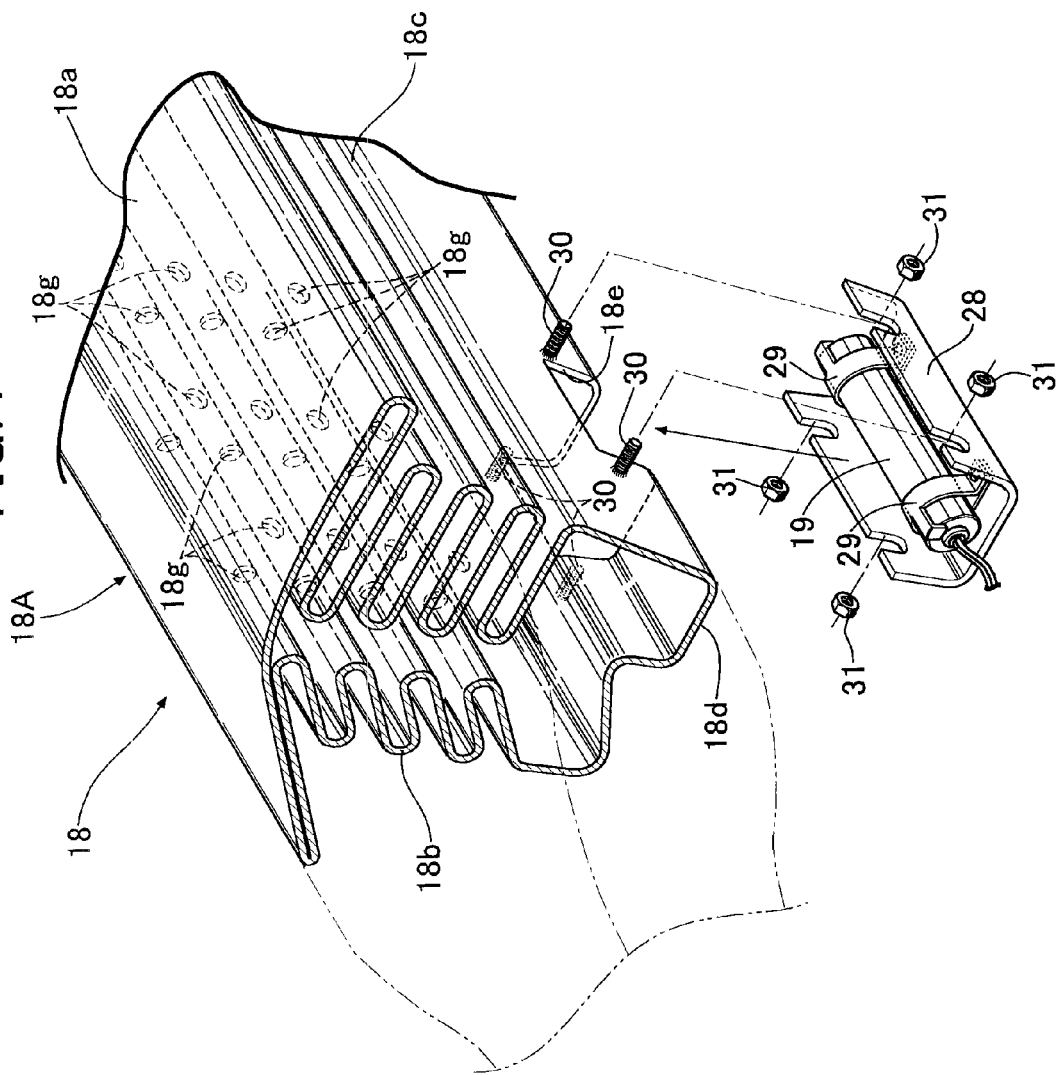
FIG. 4 is an enlarged exploded perspective view of part 4 of FIG. 3. (first embodiment)

As is clear from FIG. 2 to FIG. 4, the cylindrical inflator 19 is fixed to an inner face of a mounting bracket 28 having a U-shaped cross section by means of two fasteners 29 and 29, and this mounting bracket 28 is made to cover from the outside an opening 18e formed in the inflator support portion 18d of the air-bag 18 and is fixed thereto by means of bolts 30 and nuts 31.

As is clear from FIG. 2, an outer panel-side lip 32 is provided on the border between the garnish portion 18a and the outer panel-side folded portion 18c of the air-bag 18, and this outer panel-side lip 32 abuts against the side face 16a of the outer panel 16. Furthermore, a windshield-side lip 33 is provided on the border between the windshield-side folded portion 18b and the inflator support portion 18d of the air-bag 18, this windshield-side lip 33 abutting against a front face of the edge portion 12a of the front windshield 12. The outer panel-side lip 32 and the windshield-side lip 33 make it possible to prevent rain water, etc. from infiltrating into the inflator support portion 18d side of the air-bag 18 and protect the inflator 19.

Figure 6:
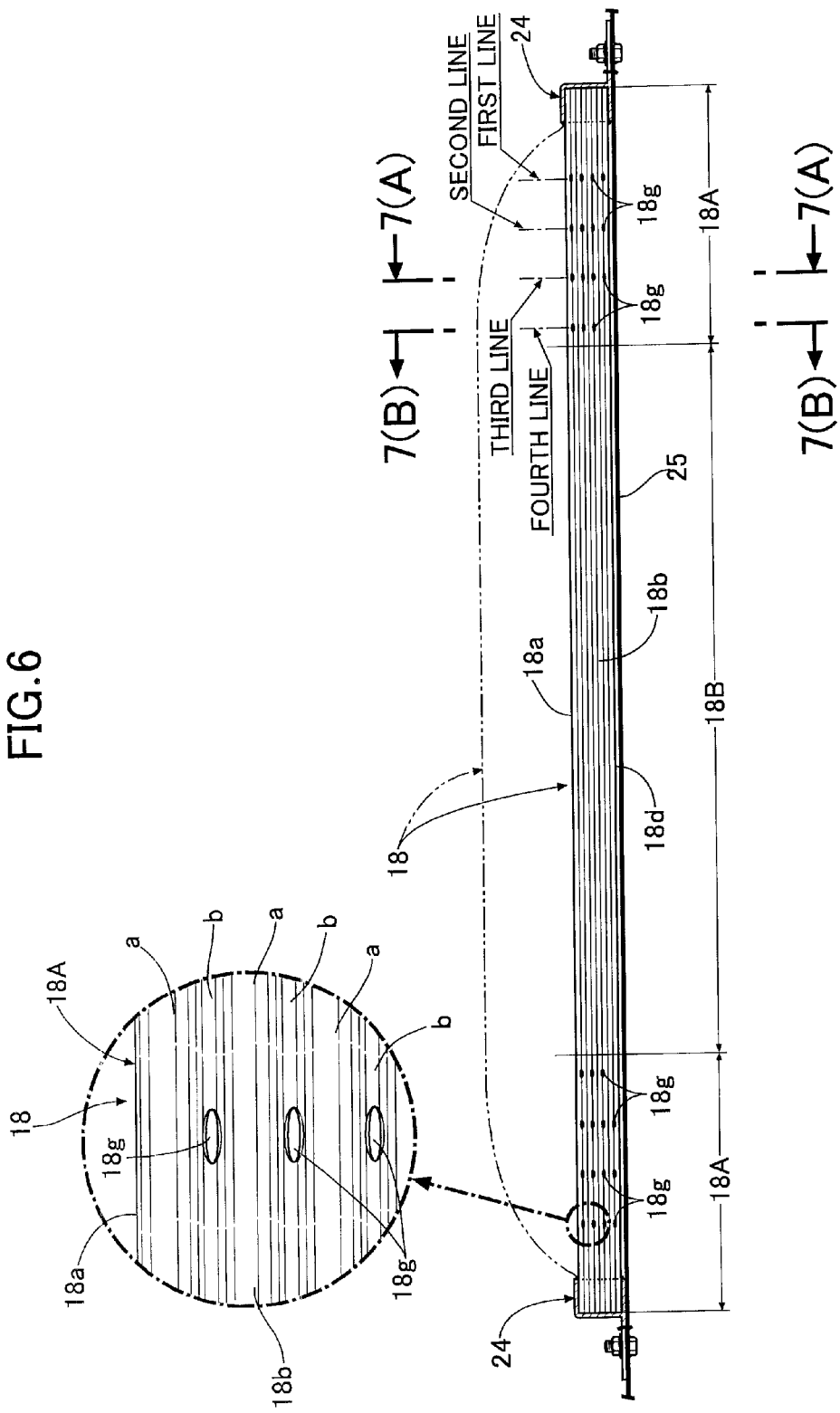
FIG. 6 is a view from the direction of arrow 6 in FIG. 3. (first embodiment)

As shown in FIG. 6, the air-bag 18 includes two incomplete deployment portions 18A and 18A positioned on opposite end sides in the longitudinal direction and one complete deployment portion 18B positioned on the central side in the longitudinal direction. The complete deployment portion 18B is a portion for which the cross-sectional shape when deployed is substantially a circle having a constant diameter; due to its circular cross section its rigidity is low and the rigidity at the time of a collision with a pedestrian is low, thus enabling an effective impact absorbing effect to be exhibited. On the other hand, the incomplete deployment portions 18A and 18A are portions that are deployed into a cone shape such that their diameter gradually decreases in going from the complete deployment portion 18B toward the end cap 24 since the end parts thereof are restrained by the end caps 24 and 24 and cannot be freely deployed; the folded part is not fully released, thereby giving a cross-sectional shape having projections and recesses that function as reinforcing ribs to thus increase the rigidity, and it becomes difficult to deform at the time of a collision with a pedestrian, thus making it impossible for an effective impact absorbing effect to be exhibited. The present embodiment gives uniform impact absorption performance over the entire longitudinal length of the air-bag 18 by forming vent holes 18g in the incomplete deployment portions 18A and 18A to thus decrease the rigidity thereof to a level equal to that of the complete deployment portion 18B.

The structure of the vent holes 18g of the air-bag 18 is now explained.

In the case of a fabric air-bag, it is necessary to maintain a predetermined deployment shape by maintaining the internal pressure at a high level by continuously supplying gas from an inflator until a pedestrian collides therewith after deployment is completed. On the other hand, in the case of the air-bag 18, which is made of metal, the completely deployed air-bag 18 can maintain its deployment shape by self rigidity and, moreover, since the deployed air-bag 18 undergoes plastic deformation due to a collision and absorbs an impact, it is not necessary to maintain the internal pressure at a high level after deployment is completed. Conversely, if the internal pressure of the air-bag 18 after deployment is completed is maintained at a high level, since it becomes difficult for the air-bag 18 to collapse at the time of a collision with a pedestrian and impact absorption performance cannot be exhibited, it becomes necessary to discharge gas through the vent holes 18g so as to maintain the internal pressure of the air-bag 18 at atmospheric pressure.

If the opening area of the vent holes 18g is too large, the gas generated by the inflator 19 leaks before deployment of the air-bag 18 is completed, and the air-bag 18 cannot be deployed into a complete shape, whereas if the opening area of the vent holes 18g is too small, since even after deployment of the air-bag 18 is completed the internal pressure does not decrease to atmospheric pressure, it becomes difficult for the air-bag 18 to collapse at the time of a collision with a pedestrian. It is therefore necessary to set the opening area of the vent holes 18g so that the air-bag 18 can be fully deployed but at the point of a collision with a pedestrian after deployment is completed the internal pressure has decreased to atmospheric pressure. From the above, it is appropriate for the sum of the opening areas of the vent holes 18g to be 700 mm$^2$±100 mm$^2$.

Furthermore, if the vent holes 18g are formed in the flat garnish portion 18a of the incomplete deployment portions 18A and 18A, the gas starts to leak via the vent holes 18g in the initial stage of deployment, and the air-bag 18 cannot be deployed rapidly. On the other hand, if the vent holes 18g are formed in the windshield-side folded portion 18b and the outer panel-side folded portion 18c of the incomplete deployment portions 18A and 18A, leakage of the gas can be suppressed due to the vent holes 18g being blocked in the initial stage of deployment, and rapid deployment of the air-bag 18 becomes possible. If a plurality of vent holes 18*g* are disposed in a dispersed manner at predetermined positions, the rigidity of the incomplete deployment portions 18A and 18A at the time of deployment can be finely adjusted.

As is clear from FIG. 6 and FIG. 7, in the first embodiment, 4 lines of vent holes 18*g* are formed in the windshield-side folded portion 18*b* and the outer panel-side folded portion 18*c* of the incomplete deployment portions 18A and 18A from the side close to the end cap 24 toward the far side. The arrangement of the vent holes 18*g* in the first to third lines from the side close to the end cap 24 is identical (see FIG. 7(A)), only the arrangement of the vent holes 18*g* in the fourth line, which is the furthest from the end cap 24, being different (see FIG. 7(B)).

The zigzag folding of each of the windshield-side folded portion 18*b* and the outer panel-side folded portion 18*c* includes four peak portions a, four valley portions b, and seven main portions c providing a connection between the peak portion a and the valley portion b. The peak portion a is a portion protruding toward the exterior of the air-bag 18 and the valley portion b is a portion protruding toward the interior of the air-bag 18.

As shown in FIG. 7(A), with regard to the first to third lines of vent holes 18*g* from the side, close to the end cap 24, of the windshield-side folded portion 18*b*, a total of four are formed, with one in each of the four valley portions b, and similarly with regard to the first to third lines of vent holes 18*g* from the side, close to the end cap 24, of the outer panel-side folded portion 18*c*, a total of four are formed, with one in each of the four valley portions b.

Furthermore, as shown in FIG. 7(B), with regard to the fourth line of vent holes 18*g* of the windshield-side folded portion 18*b* furthest from the end cap 24, a total of three are formed, with one in each of three valley portions b but none in the valley portion b that is the closest to the inflator support portion 18*d*, and similarly with regard to the fourth line of vent holes 18*g* of the outer panel-side folded portion 18*c* furthest from the end cap 24, a total of three are formed, with one in each of three valley portions b but none in the valley portion b that is the closest to the inflator support portion 18*d*.

The operation of the first embodiment of the present invention having the above-mentioned arrangement is now explained.

When the situation is normal and the air-bag 18 is not deployed, since the garnish portion 18*a* of the air-bag 18 is smoothly continuous with the outer face 16*b* of the outer panel 16 of the front pillar 15 and exhibits the function of a pillar garnish, it is possible to eliminate the need for a pillar garnish used exclusively therefor and to decrease the number of components. Moreover, by replacing a conventional pillar garnish, the air-bag 18 is compactly disposed between the front pillar 15 and the front windshield 12 and can maintain a good appearance around the front pillar 15 while eliminating the necessity for a cover or case for housing the folded air-bag 18.

Figure 8:
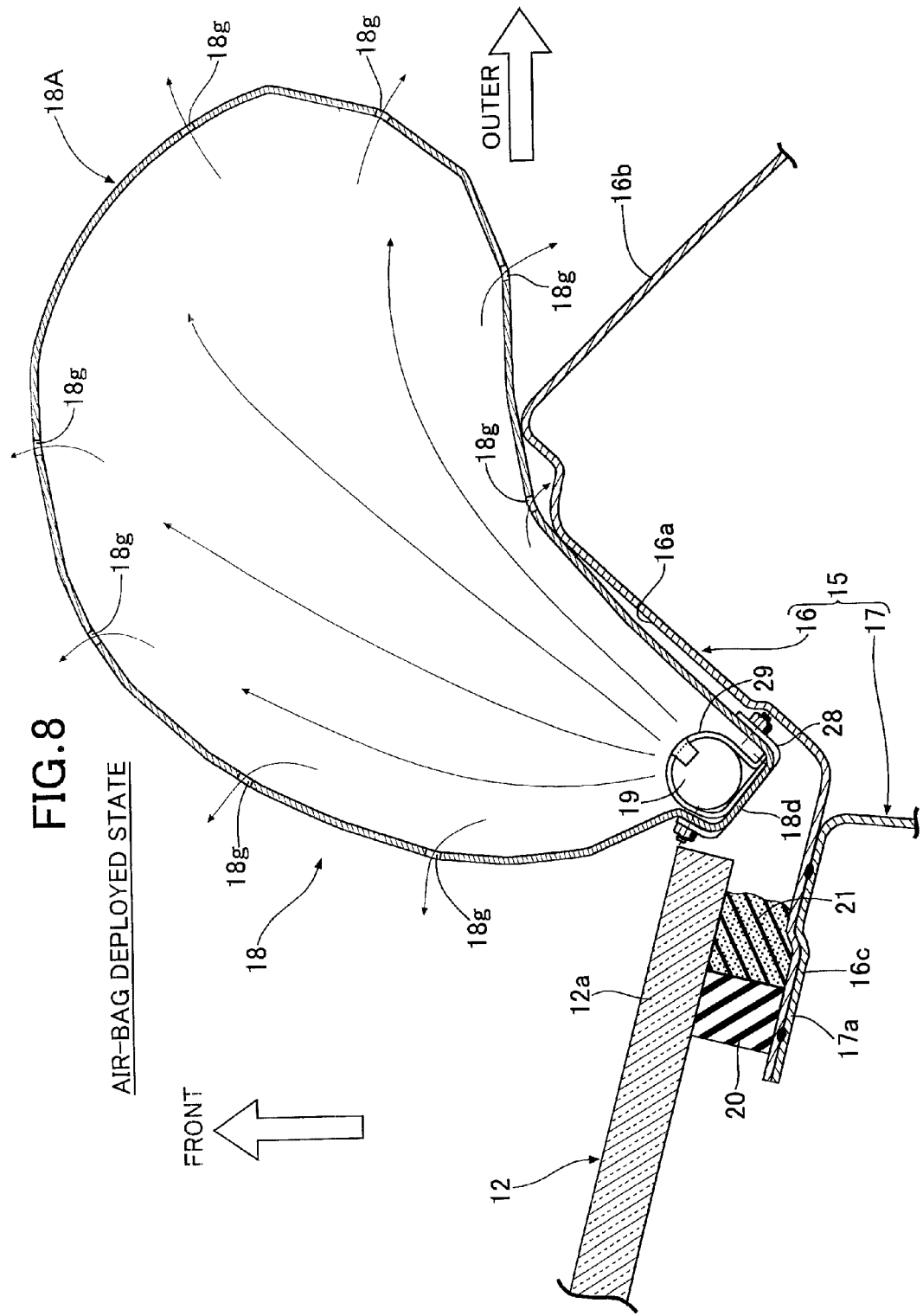
FIG. 8 is a diagram, corresponding to FIG. 2, for explaining the operation at the time of deployment of the air-bag. (first embodiment)

When it is detected that the vehicle has collided with a pedestrian, the inflator 19 operates, and the internal pressure of the air-bag 18 is increased by gas generated by the inflator 19. Due to this increase of the internal pressure, as shown in FIG. 8, the zigzag-folded windshield-side folded portion 18*b* and outer panel-side folded portion 18*c* of the air-bag 18 are first inflated toward the outside of the vehicle body and then deployed in the lateral direction so as to cover the side face 16*a* and the outer face 16*b* of the outer panel 16 of the front pillar 15.

In this process, since the air-bag 18 includes the windshield-side folded portion 18*b* and the outer panel-side folded portion 18*c*, it is possible to ensure a large circumference for the deployed air-bag 18 and cover a wide region of the front pillar 15, thus enhancing the impact absorption performance.

Furthermore, an air-bag device for a pedestrian has the characteristic of comparatively large differences easily occurring in the time before a pedestrian collides with the front pillar 15 depending on the physique of the pedestrian or the vehicle speed at the time of the collision. There is therefore the problem that a conventional fabric air-bag requires a large capacity inflator for continuously generating a gas in order to maintain a deployed state over a predetermined period of time. On the other hand, in the present embodiment, since the metal air-bag 18 is employed, once deployed the air-bag 18 maintains its deployed state even after the supply of gas is stopped, and the impact of a collision with a pedestrian is absorbed by plastic deformation; with a small capacity of the inflator 19 effective impact absorption performance can be exhibited regardless of the timing with which a pedestrian collides with the front pillar 15.

When the air-bag 18 is deployed, since the incomplete deployment portions 18A and 18A thereof are connected to the blocking members 24 and 24 in a folded state, they are difficult to deploy compared with the complete deployment portion 18B. As a result, the complete deployment portion 18B of the air-bag 18 is deployed into a substantially circular cross section, whereas the incomplete deployment portions 18A and 18A are deployed into a shape having projections and recesses due to the folded parts not being completely released, and the projections and recesses function as reinforcing ribs, thus causing a possibility that the rigidity at the time of a collision with a pedestrian will becomes too high for effective impact absorption performance to be exhibited.

However, in the present embodiment, since the plurality of vent holes 18*g* are formed in a dispersed manner in the incomplete deployment portions 18A and 18A of the air-bag 18, the rigidity of the incomplete deployment portions 18A and 18A is decreased to the same level as the rigidity of the complete deployment portion 18B by means of the vent holes 18*g*, and uniform impact absorption performance can be exhibited over the entire longitudinal length of the air-bag 18. Moreover, since the vent holes 18*g* are formed in the valley portion b of the fold, it is difficult for the vent holes 18*g* to open in the initial stage of deployment of the air-bag 18, thus making it possible to rapidly deploy the air-bag 18.

Furthermore, since the air-bag 18 is relatively completely deployed at a position of the incomplete deployment portions 18A and 18A close to the complete deployment portion 18B, the rigidity thereof becomes relatively low. It is therefore possible to make the rigidity of the air-bag 18 more uniform over the entire longitudinal length by reducing by one the number of vent holes 18*g* in the fourth line of the windshield-side folded portion 18*b* and the outer panel-side folded portion 18*c* to three (see FIG. 6). In this way, disposing the vent holes 18*g* in the longitudinal direction and the circumferential direction of the air-bag 18 at a fixed pitch enables the degree of freedom in setting the impact absorption performance thereof to be enhanced.

In the first embodiment, the air-bag 18 is disposed at a position of a conventional pillar garnish, but since the air-bag 18 is made of metal, the front pillar 15 itself may be replaced by the air-bag 18, thus reducing the weight. Furthermore, the inflator 19 is built into the air-bag 18, but it may be disposed on the exterior of the air-bag 18. For example, a gas may be supplied from an outside inflator 19 by making a pipe extend through the end cap 24. In this case, the inflator support portion 18d of the air-bag 18 becomes unnecessary, and the window glass-side folded portion 18b and the outer panel-side folded portion 18c are linked on the vehicle body side. Furthermore, two folded portions, that is, the window glass-side folded portion 18b and the outer panel-side folded portion 18c, are provided, but either one thereof may be provided on its own, and it may be wound into a roll shape.

Embodiment 2

Figure 9:
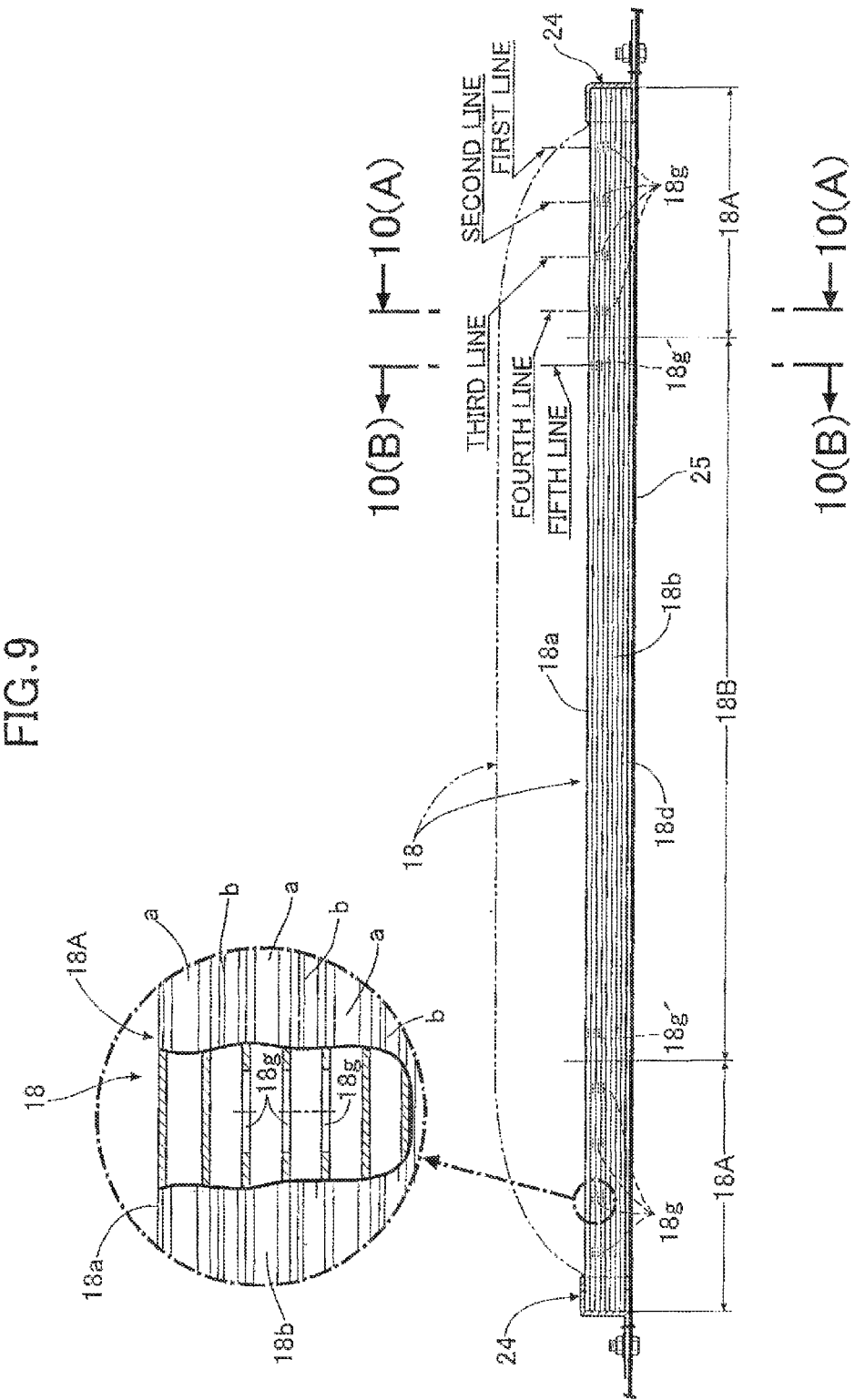
FIG. 9 is a view corresponding to FIG. 6 above. (second embodiment)

A second embodiment of the present invention is now explained by reference to FIG. 9 and FIG. 10.

In the first embodiment, four lines of vent holes 18g are formed in each of the incomplete deployment portions 18A and 18A, but in the second embodiment a further fifth line of auxiliary vent holes 18g' adjacent to a fourth line of vent holes 18g of incomplete deployment portions 18A and 18A are formed at opposite ends of a complete deployment portion 18B.

The four lines of vent holes 18g of each of the incomplete deployment portions 18A and 18A of the first embodiment are formed in the zigzag-valley portion b of the fold, but in the second embodiment they are formed in a main portion c; the number of vent holes 18g in each line is three for each of a windshield-side folded portion 18b and an outer panel-side folded portion 18c, and they are formed so as to be biased toward the front face side (garnish portion 18a side) of the air-bag 18 (see FIG. 10(A)).

Furthermore, the number of auxiliary vent holes 18g' of the fifth line formed in the main portion c of the zigzag-fold of the complete deployment portion 18B is three for each of the windshield-side folded portion 18b and the outer panel-side folded portion 18c in the same way as for the vent holes 18g of the first to fourth lines, but the positions thereof are displaced by 1 pitch further toward the front face side (garnish portion 18a side).

In this way, since the vent holes 18g and the auxiliary vent holes 18g' are disposed so as to be biased toward the front face side (garnish portion 18a side) of the air-bag 18, when a load due to a collision with a pedestrian is inputted into the front face side of the air-bag 18, the vent holes 18g and the auxiliary vent holes 18g' are concentrated in the vicinity of the part where the load is inputted to thus decrease the rigidity effectively, thereby reducing the reaction force toward the pedestrian, making the air-bag 18 easily collapsible, and enhancing the impact absorbing effect.

Furthermore, since the vent holes 18g and the auxiliary vent holes 18g' are formed not in the zigzag-valley portion b of the fold but in the main portion c, compared with a case in which they are formed in the valley portion b the rigidity can be reduced more effectively. Moreover, since the opposing main portions c in the initial stage of deployment suppress leakage of gas, the effect in suppressing leakage of gas in the initial stage of deployment of the air-bag 18 increases compared with a case in which they are formed in the valley portion b, and the deployment performance improves.

Furthermore, since the auxiliary vent holes 18g' are formed at opposite ends of the complete deployment portion 18B, and the auxiliary vent holes 18g' are disposed so as to be biased further toward the front face side of the air-bag 18 than the vent holes 18g are, deformation of the incomplete deployment portions 18A and 18A at the time of a collision with a pedestrian is easily transmitted to the complete deployment portion 18B, and the rigidity of the incomplete deployment portions 18A and 18A can be reduced more effectively.

Embodiment 3

A third embodiment of the present invention is now explained by reference to FIG. 11 to FIG. 16.

Figure 11:
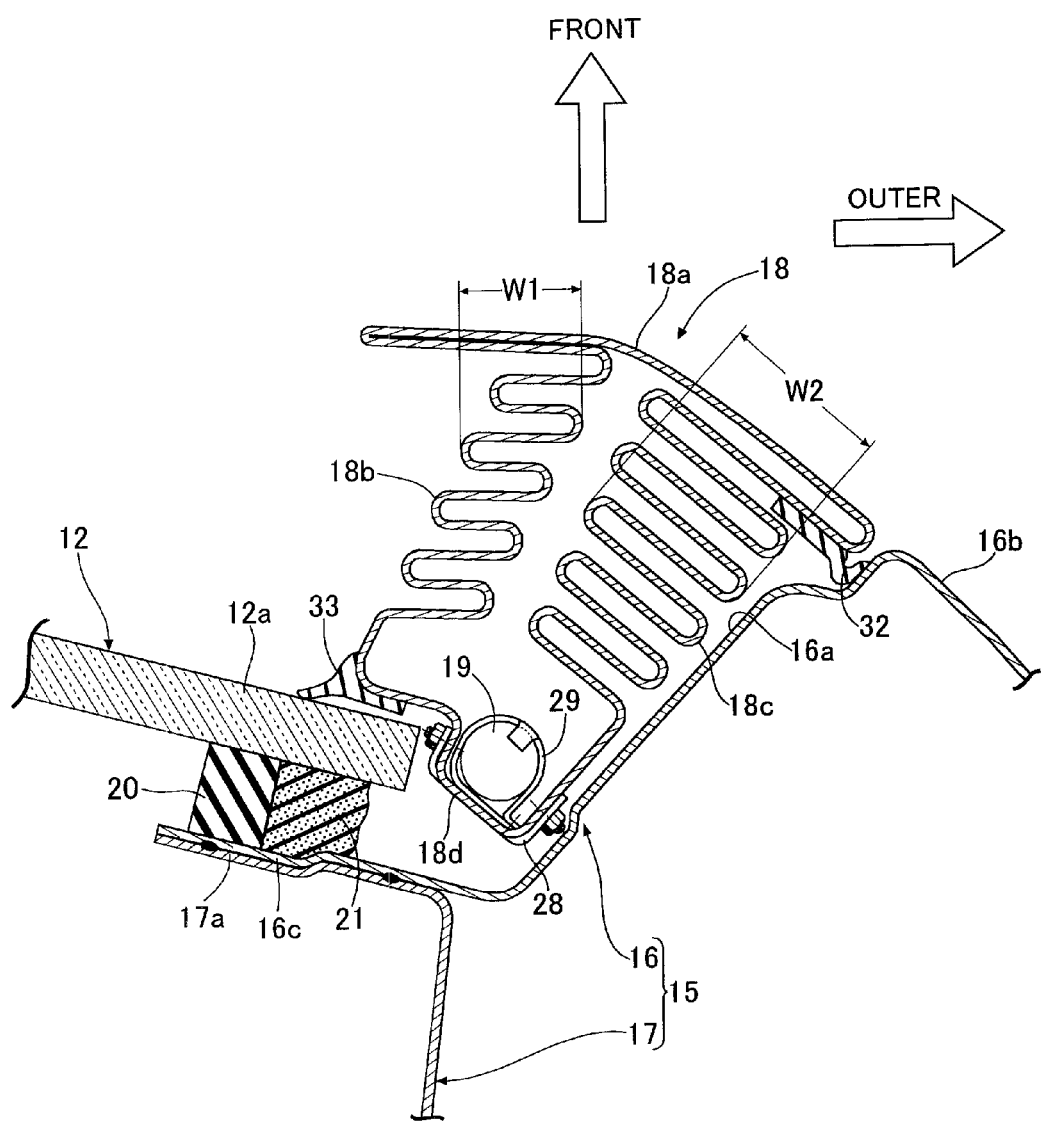
FIG. 11 is a view corresponding to FIG. 2 above. (third embodiment)
Figure 13:
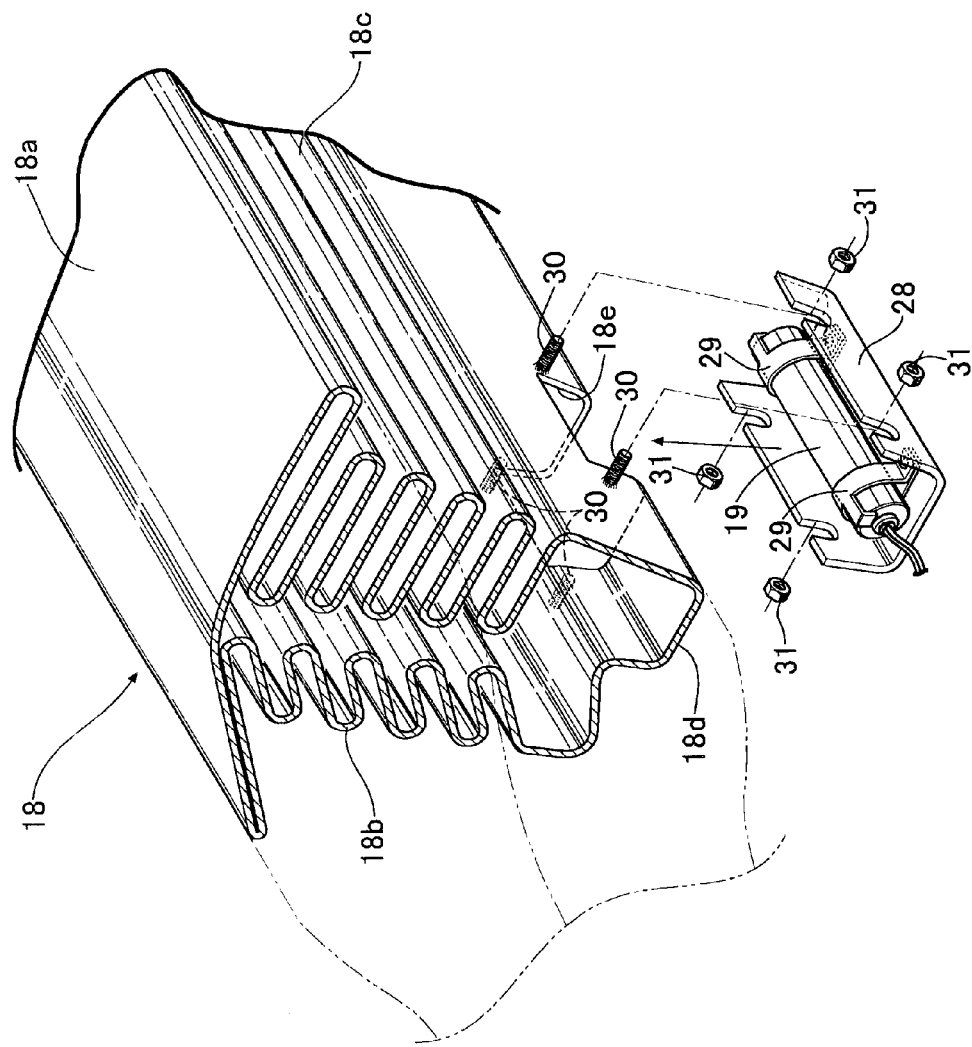
FIG. 13 is an enlarged exploded perspective view of part 13 of FIG. 12. (third embodiment)

As shown in FIG. 11 and FIG. 13, in order to ensure an expansion allowance when an air-bag 18 is deployed, a windshield-side folded portion 18b and an outer panel-side folded portion 18c of the air-bag 18 are folded in a zigzag folded manner (zigzag folding) on a reverse face side (rear side) of a garnish portion 18a. In this arrangement, a folded width W2 of the outer panel-side folded portion 18c is set to be larger than a folded width W1 of the windshield-side folded portion 18b.

Figure 14:
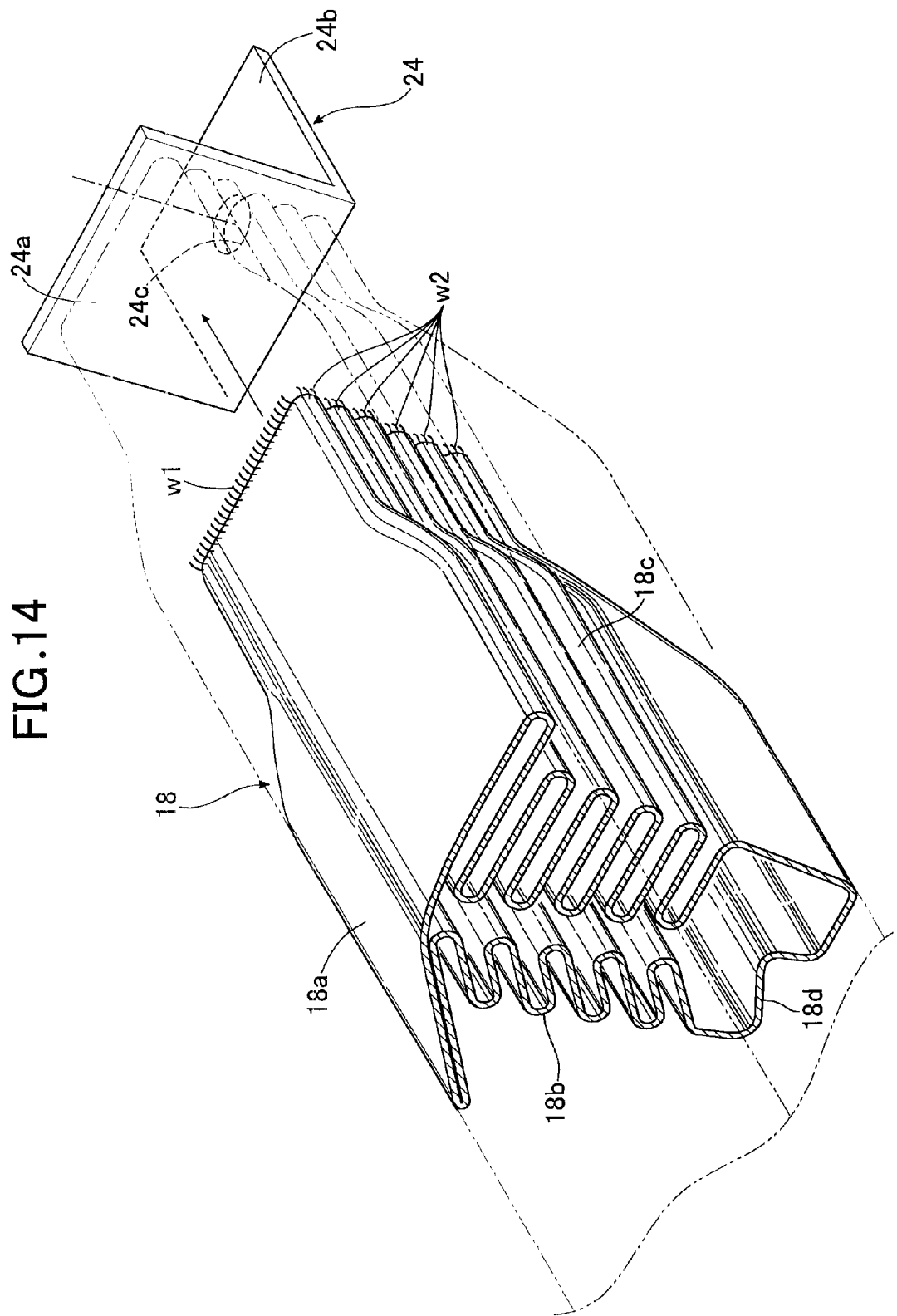
FIG. 14 is an enlarged perspective view of part 14 of FIG. 12. (third embodiment)

As is clear from FIG. 12, FIG. 14, and FIG. 15, opposite end parts of the folded air-bag 18 are press formed with a taper, flat plate-shaped blocking portions 24a and 24a of end caps 24 and 24 are abutted thereagainst and welded thereto, and opposite end parts of the air-bag 18 are thus blocked. If a space for disposing the opposite end parts of the air-bag 18 can be ensured on the vehicle body side, it is not necessary to press form the opposite end parts with a taper. Each end cap 24 has a mounting portion 24b connected to the blocking portion 24a, and the air-bag 18 is fixed along a front pillar 15 by screwing a nut 27 onto a bolt 26 extending through a bolt hole 24c of the mounting portion 24b and a vehicle body panel 25.

Of the longitudinally opposite end portions of the folded air-bag 18, a garnish portion 18a and an inflator support portion 18d, which are not zigzag-folded, are abutted against the blocking portion 24a of the end cap 24 via the entire width and fillet welded thereto with a weld w1, and the zigzag-folded windshield-side folded portion 18b and outer panel-side folded portion 18c are abutted against the blocking portion 24a only via the tip of their peak portions and fillet welded thereto with welds w2.

Figure 16:
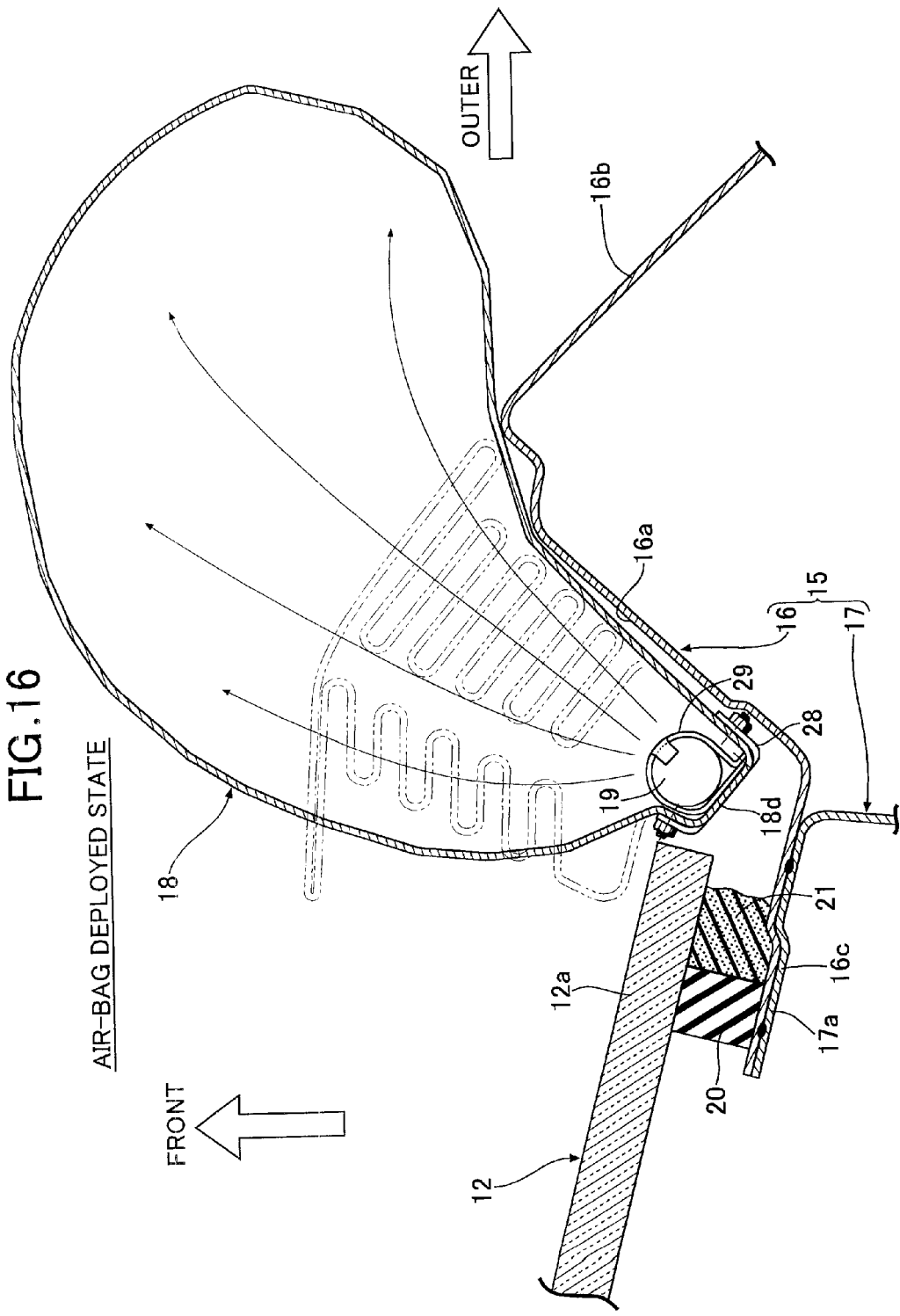
FIG. 16 is a diagram, corresponding to FIG. 11, for explaining the operation at the time of deployment of the air-bag. (third embodiment)

When it is detected that the vehicle has collided with a pedestrian, the inflator 19 operates, and the internal pressure of the air-bag 18 is increased by a gas generated by the inflator 19. Due to this increase of the internal pressure, as shown in FIG. 16, the zigzag-folded windshield-side folded portion 18b and outer panel-side folded portion 18c of the air-bag 18 are first inflated toward the outside of the vehicle body and then deployed in the lateral direction so as to cover a side face 16a and an outer face 16b of an outer panel 16 of the front pillar 15.

When the air-bag 18 is deployed, since the longitudinally opposite end portions thereof are connected to the end caps 24 and 24 in a folded state, they are difficult to deploy compared with the longitudinally central portion. As a result, the longitudinally central portion of the air-bag 18 is deployed into a substantially circular cross section, whereas the longitudinally opposite end portions are deployed into a shape having projections and recesses due to the folded parts not being completely released, and the projections and recesses function as reinforcing ribs, thus causing a possibility that the rigidity at the time of a collision with a pedestrian will become too high for effective impact absorption performance to be exhibited.

However, in accordance with the present embodiment, since the longitudinally opposite end portions of the air-bag 18 are abutted against the end caps 24 and 24 and bendably fillet welded with welds w1 and w2, deforming the edges of the air-bag 18 via the parts of the fillet welds w1 and w2 so as to bend radially outward enables the longitudinally opposite end portions of the air-bag 18 to be fully deployed. This enables not only the rigidity of the longitudinally opposite end portions of the deployed air-bag 18 to be reduced to the same level as the rigidity of the longitudinally intermediate portion and uniform impact absorption performance to be exhibited over the entire length of the air-bag 18, but also for the length of the incomplete deployment portion 18A to be reduced.

In addition, since the windshield-side folded portion 18b and the outer panel-side folded portion 18c of the air-bag 18 are fillet welded with the welds w2 to the end cap 24 only via the tip of the peak portions thereof, gas will leak via gaps in the parts connected to the end caps 24 and 24 during deployment, but the gaps exhibit the same function as that of the vent holes, and do not cause any problem in deployment of the air-bag 18.

Embodiment 4

Figure 17:
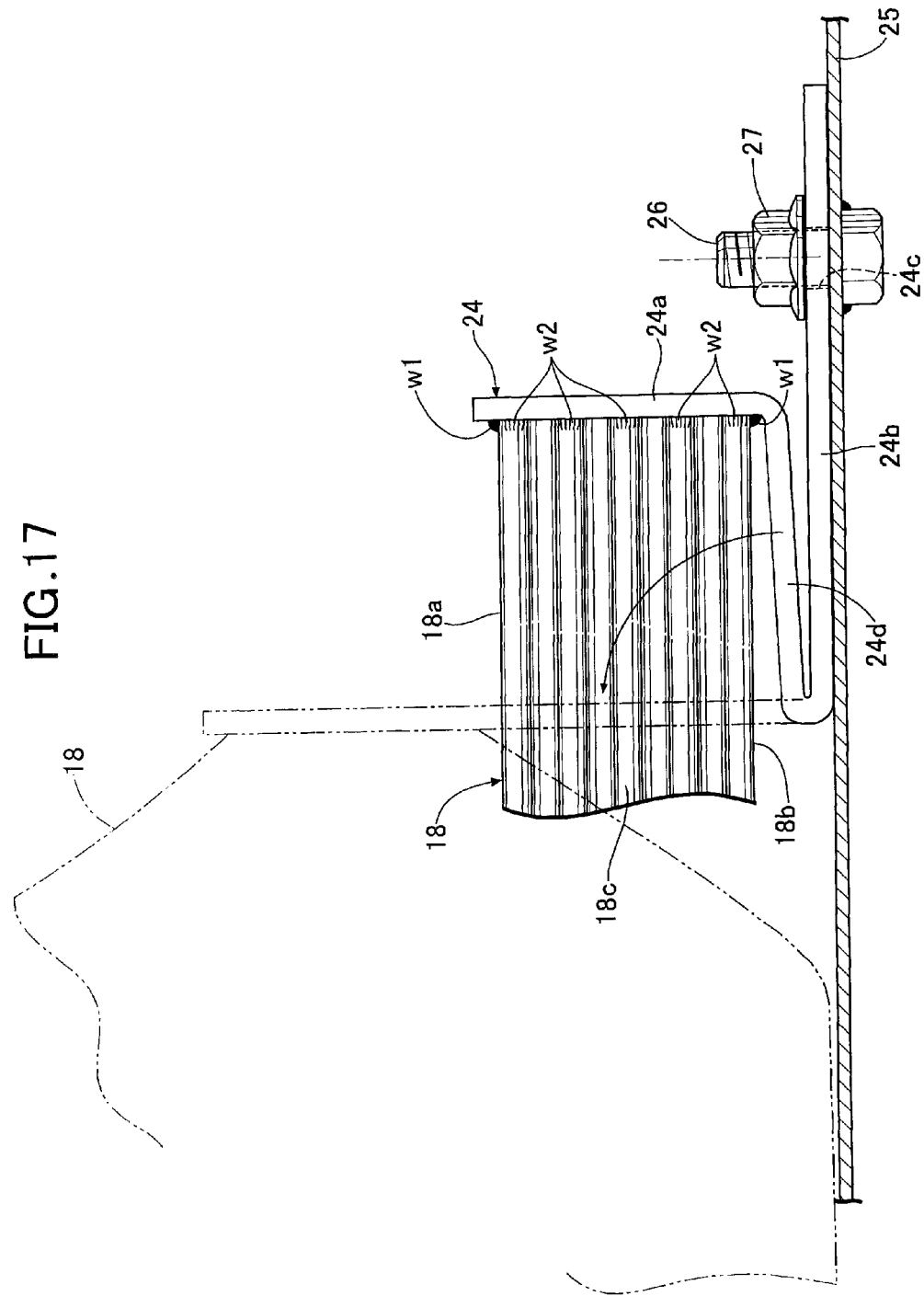
FIG. 17 is a view corresponding to FIG. 15 above. (fourth embodiment)

A fourth embodiment of the present invention is now explained by reference to FIG. 17.

In the fourth embodiment, a blocking portion 24a and a mounting portion 24b of an end cap 24 are connected via a bendable stay 24d, and the mounting portion 24b and the stay 24d are bent so as to overlap one another when the air-bag 18 is not deployed.

The stay 24d is made to rise with respect to the mounting portion 24b by means of a reaction force received from a vehicle body panel 25 when the air-bag 18 is deployed, and the air-bag 18 can thereby move in a direction away from the vehicle body panel 25. As a result, longitudinally opposite end portions of the air-bag 18 can be freely deployed without interference from the vehicle body panel 25, and the deployment performance of the longitudinally opposite end portions of the air-bag 18 further improves.

Embodiment 5

Figure 18:
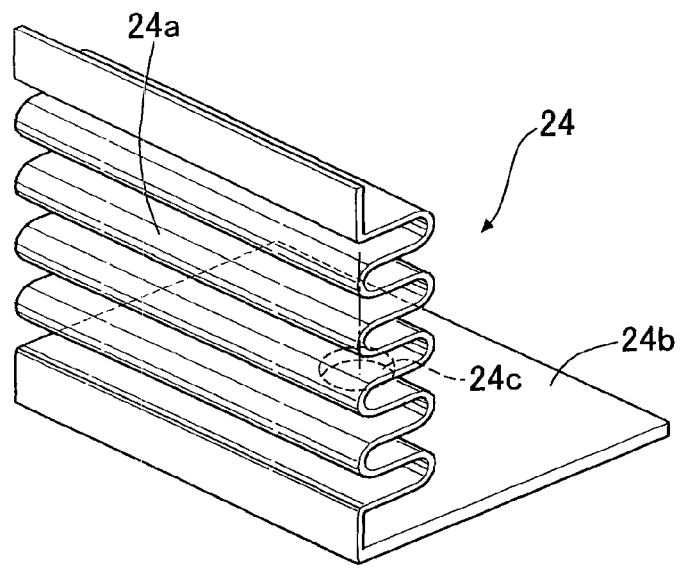
FIG. 18 is a perspective view of an end cap. (fifth embodiment)

A fifth embodiment of the present invention is now explained by reference to FIG. 18.

In the fifth embodiment, a blocking portion 24a of an end cap 24 is zigzag-folded, and when an air-bag 18 is deployed the zigzag-fold of the blocking portion 24a expands, thus further improving the deployment performance of longitudinally opposite end portions of the air-bag 18. A mounting portion 24b may also be made to move in the rising direction with, as a fulcrum, a bolt 26 for mounting on a vehicle body.

Embodiment 6

Figure 19:
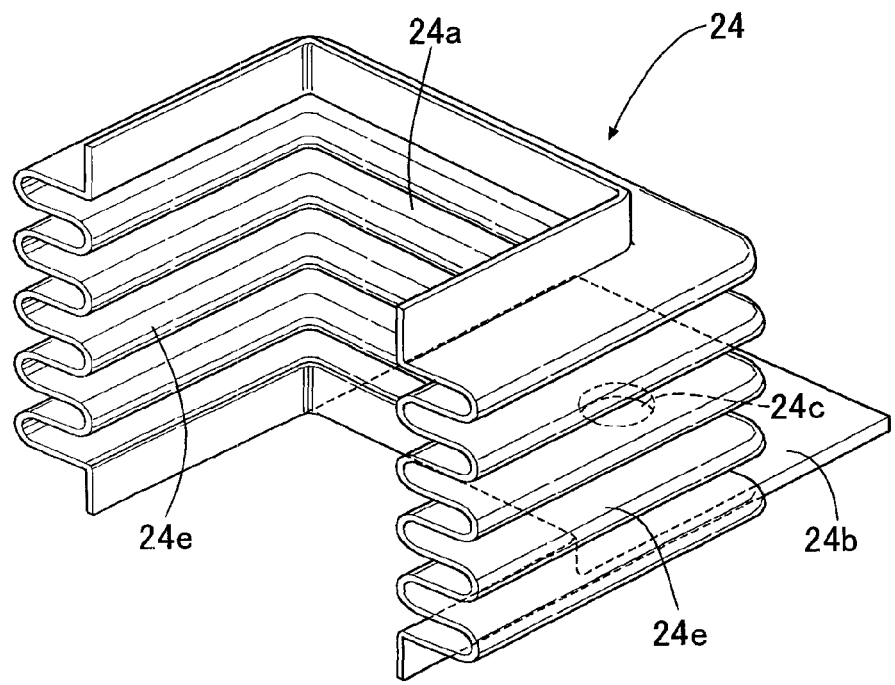
FIG. 19 is a perspective view of an end cap. (sixth embodiment)
Figure 23:
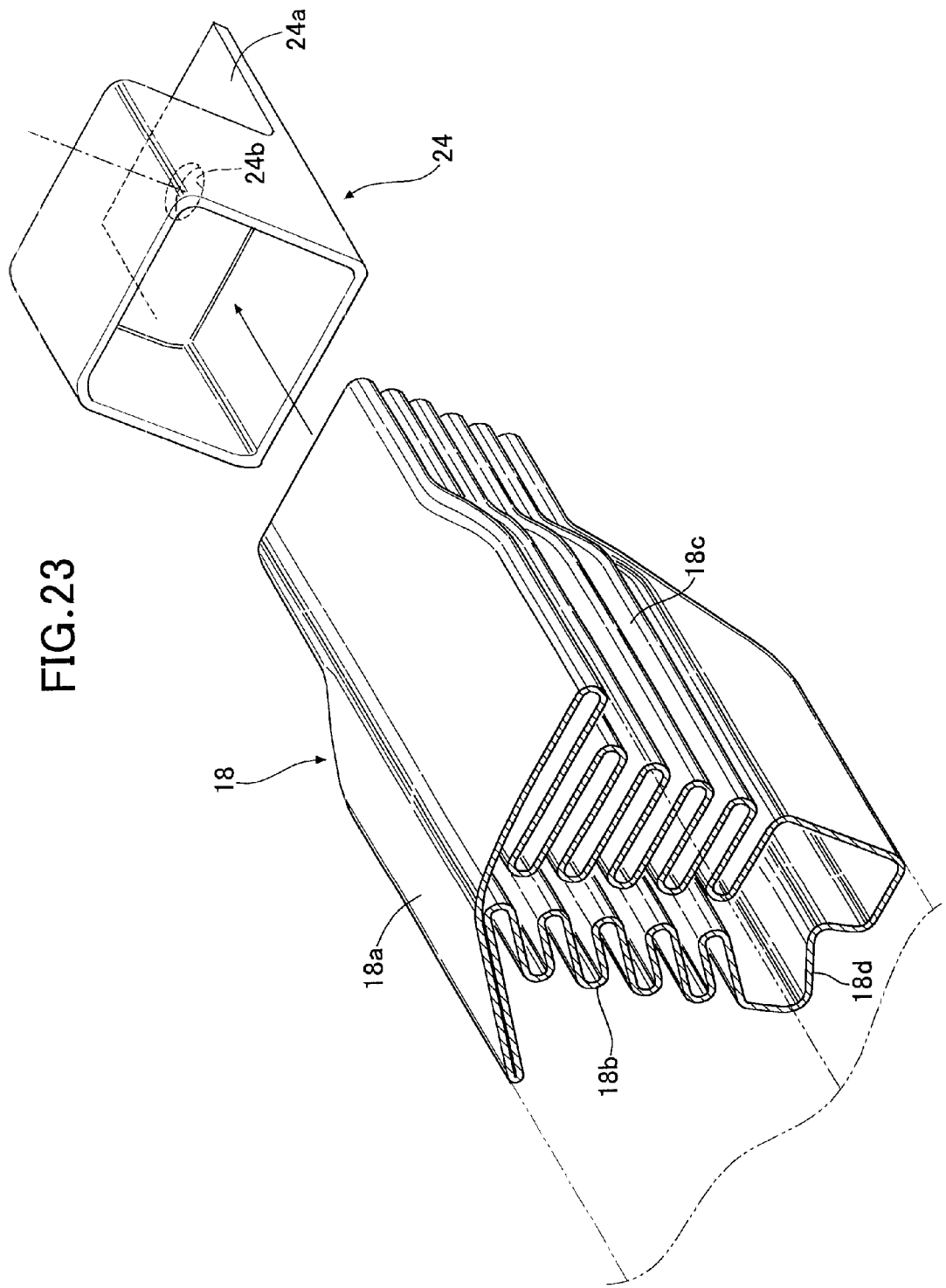
FIG. 23 is an enlarged perspective view of part 23 in FIG. 22. (ninth embodiment)
Figure 24:
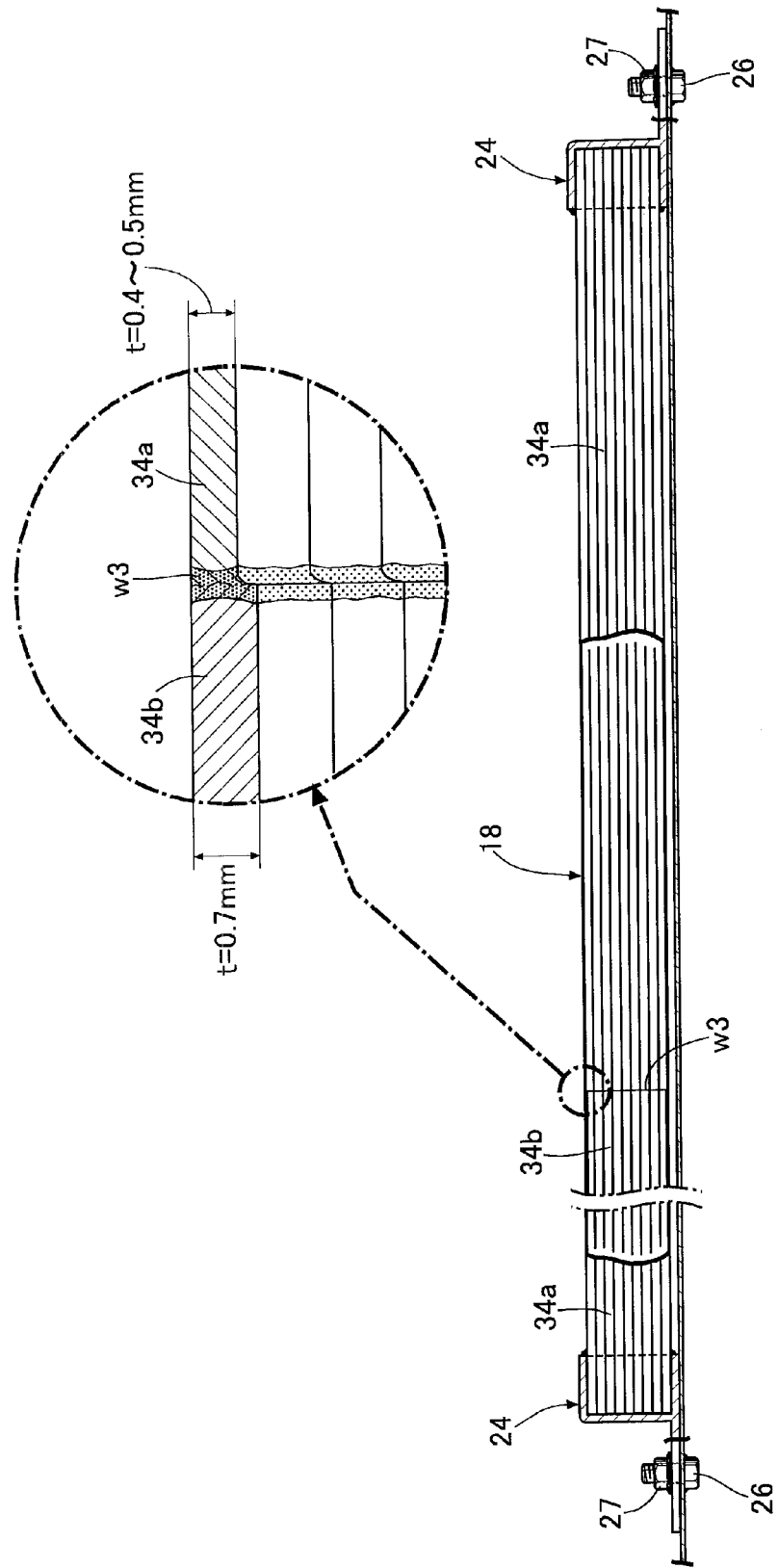
FIG. 24 is a sectional view along line 24-24 in FIG. 22. (ninth embodiment)

A sixth embodiment of the present invention is now explained by reference to FIG. 19.

The sixth embodiment is a modification of the fifth embodiment; a pair of zigzag-folded side wall portions 24e and 24e are formed integrally with opposite edges of a zigzag-folded blocking portion 24a of an end cap 24 so as to cover a windshield-side folded portion 18b and an outer panel-side folded portion 18c of an air-bag 18.

In accordance with the sixth embodiment, in addition to the operational effects of the fifth embodiment, an operational effect of the side wall portions 24e and 24e in suppressing the leakage of gas from end parts of the windshield-side folded portion 18b and the outer panel-side folded portion 18c, which are fillet welded with welds w2 only via the tip of peak portions thereof, can be achieved.

Embodiment 7

A seventh embodiment of the present invention is now explained by reference to FIG. 20.

An end cap 24 of the seventh embodiment is formed from a cap-shaped member having one open face. That is, the end cap 24, which is welded to an L-shaped bracket 35 fixed to a vehicle body panel 25 by means of a bolt 26 and a nut 27, includes a flat plate-shaped blocking portion 24a, against which an opening of longitudinally opposite end portions of an air-bag 18 abuts, and a tubular portion 24f extending from the periphery of the blocking portion 24a toward the air-bag 18 side, and a portion on the tip side of the tubular portion 24f is formed with reduced thickness so as to have low strength. The entirety of the tubular portion 24f may be made to have low strength.

Of longitudinally opposite end portions of the air-bag 18 inserted into the tubular portion 24f of the end cap 24, a flat garnish portion 18a and an inflator support portion 18d are fillet welded with a weld w1 over the entire length, and a windshield-side folded portion 18b and an outer panel-side folded portion 18c are fillet welded with welds w2 only via the tip of peak portions.

In accordance with the present embodiment, when the air-bag 18 is deployed, the thin portion of the tubular portion 24f of the end cap 24 deforms so as to expand radially outward together with the air-bag 18, thereby enabling the longitudinally opposite end portions of the air-bag 18 to bend together with the thin portion and be fully deployed. This enables not only the rigidity of the longitudinally opposite end portions of the deployed air-bag 18 to be reduced to the same level as the rigidity of the longitudinally intermediate portion and uniform impact absorption performance to be exhibited over the entire length of the air-bag 18, but also for the length of the incomplete deployment portion 18A to be reduced.

Embodiment 8

An eighth embodiment of the present invention is now explained by reference to FIG. 21.

The eighth embodiment is a modification of the seventh embodiment; expandable slits 24g are formed in four corners of a tubular portion 24f of a cap-shaped end cap 24.

In accordance with the present embodiment, when an air-bag 18 is deployed, the tubular portion 24f of the end cap 24 easily expands due to the slits 24g, and longitudinally opposite end portions of the air-bag 18 can be more reliably deployed.

Embodiment 9

A ninth embodiment of the present invention is now explained by reference to FIG. 22 to FIG. 26.

As shown in FIG. 22 to FIG. 24 and FIG. 25(A), a blank material 34 of an air-bag 18 is formed from a tailored blank material in which two longitudinally opposite end portions 34a and 34a and one longitudinally central portion 34b are tailored blank welded with welds w3. The tailored blank material is formed by abutting blank materials having different sheet thicknesses against each other and welding, and in the present embodiment the sheet thickness of the longitudinally opposite end portions 34a and 34a is 0.4 mm to 0.5 mm, and the sheet thickness of the longitudinally central portion 34b is 0.7 mm. That is, the difference between the sheet thickness of the longitudinally opposite end portions 34a and 34a and the sheet thickness of the longitudinally central portion 34b of the blank material 34 is 0.2 mm to 0.3 mm.

Furthermore, when the entire length of the blank material 34 is defined as L, the length of each of the longitudinally opposite end portions 34a and 34a is L/3, and the length of the longitudinally central portion 34b is L/3. That is, the blank material 34 is formed by tailored blank welding with welds w3 two longitudinally opposite end portions 34a and 34a and one longitudinally central portion 34b, which have an identical length of L/3.

The blank material 34 is zigzag-folded by roll-forming processing or press forming and then formed into a tube shape by superimposing opposite edges thereof along the longitudinal direction and MIG welding or spot welding.

As shown in FIG. 25(B), the blank material 34 may be formed by superimposing two longitudinally opposite end portions 34a and 34a and one longitudinally central portion 34b and spot welding with welds w4. In this process, forming a step in the longitudinally central portion 34b, which is thicker, and superimposing the longitudinally opposite end portions 34a and 34a, which are thinner, on the step enables a connecting part to be made smooth. In the air-bag 18 thus completed, gas will leak through a gap between portions where the blank material 34 is discontinuously spot welded with the welds w4, but making this gap function as a vent hole of the air-bag 18 enables the production cost to be cut by making it unnecessary to form a special vent hole.

The air-bag 18 is then formed by blocking openings at opposite ends of the metal tube formed from the blank material 34 by means of end caps 24 and 24.

When the air-bag 18 is deployed, since the longitudinally opposite end portions 34a and 34a thereof are connected to the blocking member 24 and 24 in a folded state, they are difficult to deploy compared with the longitudinally central portion 34b. As a result, the longitudinally central portion 34b of the air-bag 18 is deployed into a substantially circular cross section, whereas the longitudinally opposite end portions 34a and 34a are deployed into a shape having projections and recesses due to the folded parts not being completely released, and the projections and recesses function as reinforcing ribs, thus causing a possibility that the rigidity at the time of a collision with a pedestrian will become too high for effective impact absorption performance to be exhibited.

However, in the present embodiment, since the sheet thickness of the longitudinally opposite end portions 34a and 34a of the air-bag 18 is smaller than the sheet thickness of the longitudinally central portion 34b, not only is it possible to enhance the impact absorption performance by making the rigidity of the air-bag 18 uniform over the entire length so that the longitudinally opposite end portions 34a and 34a, which are difficult to deploy, are deployed at the same level as the longitudinally central portion 34b, which is easy to deploy, but it is also possible to contribute to a reduction in the weight of the air-bag 18. In this arrangement, if the sheet thickness of the entire blank material 34 of the air-bag 18 is no greater than 0.7 mm, the rigidity of the longitudinally central portion 34b, which is easy to deploy, is insufficient, and when a pedestrian collides with the air-bag 18 bottoming out (a state in which the air-bag 18 is completely collapsed and inner faces are in contact with each other) occurs and the impact absorption performance might be degraded.

Furthermore, when the sheet thickness of a blank material 34 as a single sheet varies between longitudinally opposite end portions 34a and 34a and a longitudinally central portion 34b, there is the problem that the production cost increases, but employing the blank material 34, which is formed by joining the two longitudinally opposite end portions 34a and 34a and the one longitudinally central portion 34b, enables the production cost to be cut. Moreover, since the length of the two longitudinally opposite end portions 34a and 34a of the blank material 34 is equal to the length of the one longitudinally central portion 34b, control of the dimensions of the blank material 34 is simplified, thus further reducing the cost.

Figure 26:
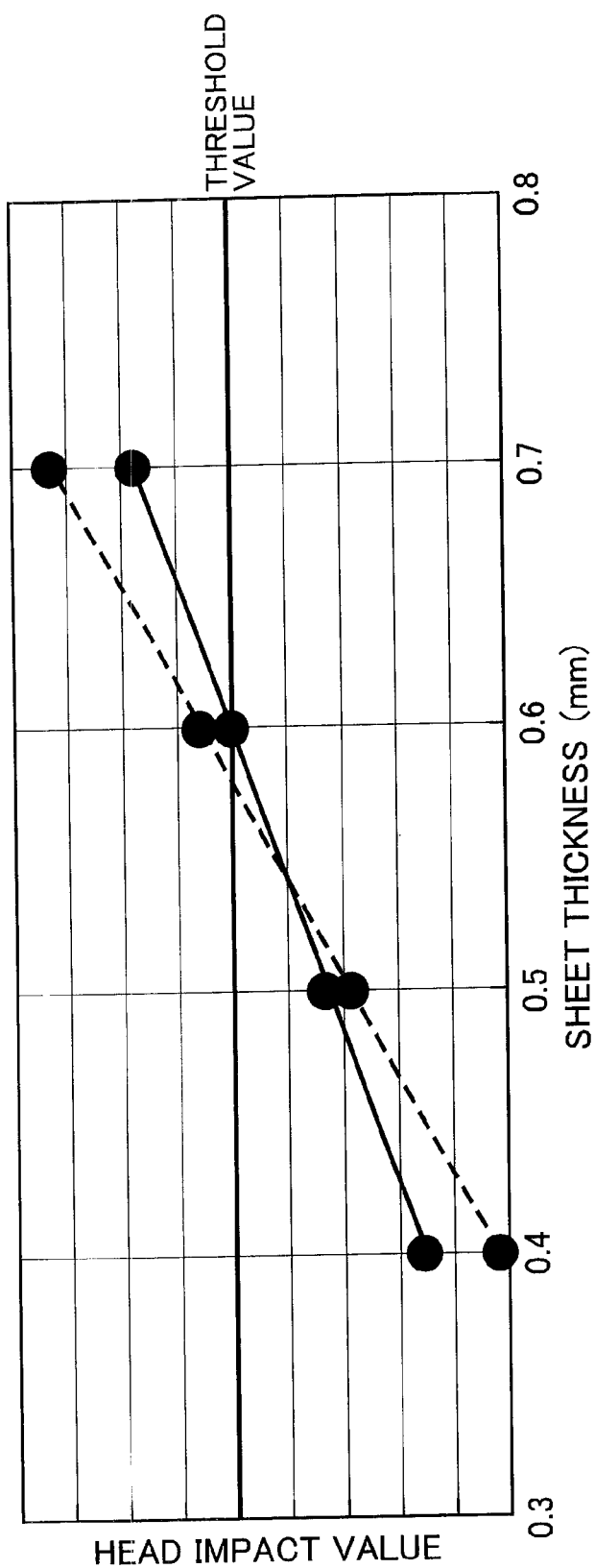
FIG. 26 is a graph showing the relationship between head impact value and sheet thickness of longitudinally opposite end portions of a blank material. (ninth embodiment)

FIG. 26 shows the relationship between sheet thickness of the longitudinally opposite end portions 34a and 34a (abscissa) and head impact value (ordinate) in an air-bag 18 having a length of 800 mm. It can be seen that even at a position 250 mm from the longitudinal center of the air-bag 18 (solid line) or at a position 300 mm from the longitudinal center of the air-bag 18 (broken line), when the sheet thickness is 0.6 mm or greater, the head impact value exceeds a threshold value, and sufficient impact absorption performance cannot be exhibited. It is therefore surmised that the sheet thickness of the longitudinally opposite end portions 34a and 34a that can give a necessary strength without the head impact value exceeding a threshold value is 0.4 mm to 0.5 mm. From the above, with regard to the blank material 34 of the present embodiment, the sheet thickness of the longitudinally opposite end portions 34a and 34a is 0.7 mm, and the sheet thickness of the longitudinally central portion 34b is 0.5 mm.

Embodiment 10

A tenth embodiment of the present invention is now explained by reference to FIG. 27 to FIG. 29.

Figure 27:
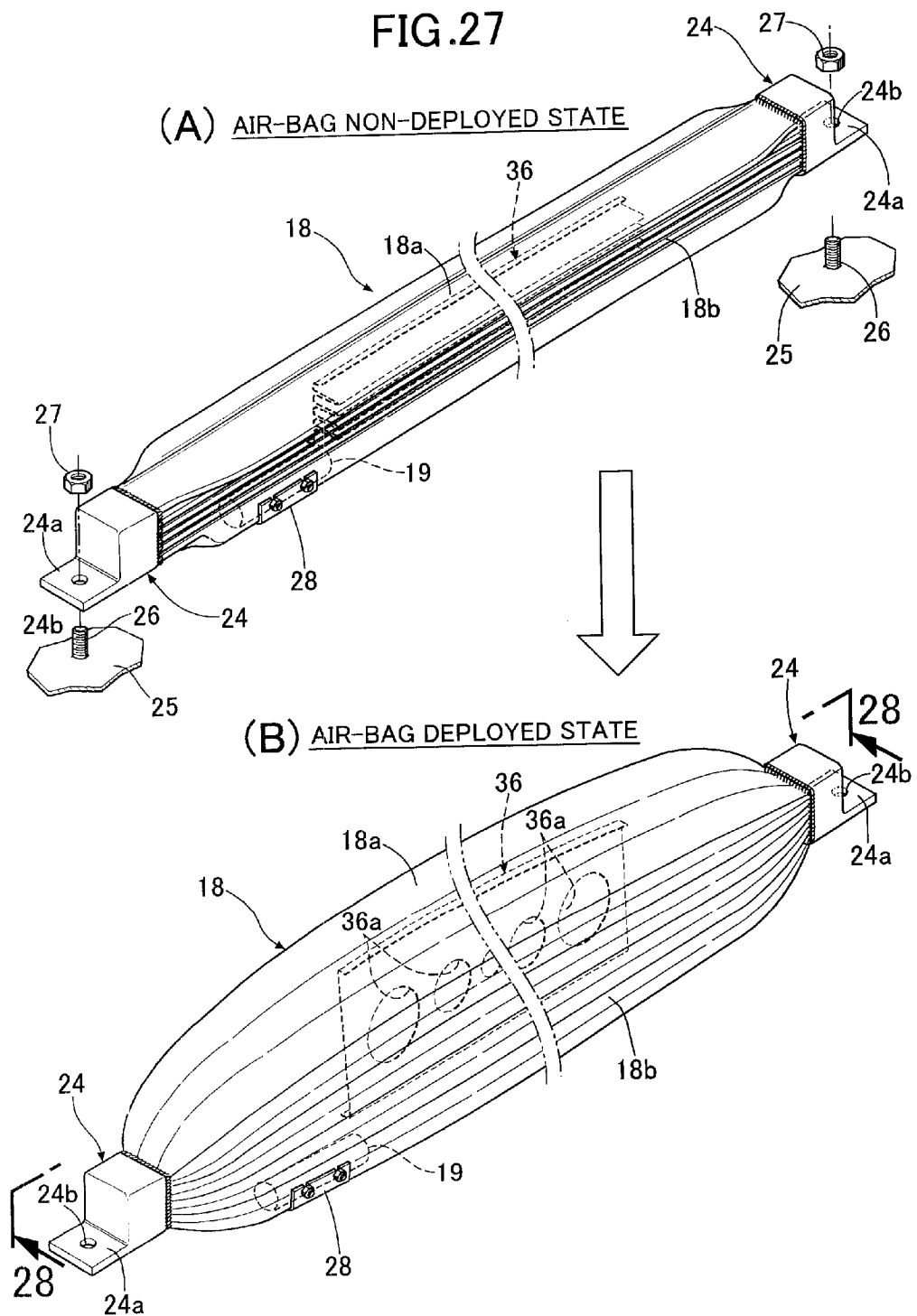
FIG. 27 is a perspective view of an air-bag. (tenth embodiment)

As is clear from FIG. 27 and FIG. 28, in a longitudinally central portion, that is, a portion other than longitudinally opposite end portions, of an air-bag 18, a garnish portion 18a and an inflator support portion 18d are connected via a folded reinforcing member 36 formed by zigzag-folding a rectangular metal sheet. The side edge, along the longitudinal direction, of the reinforcing member 36 is spot welded with a weld w5 to an inner face of the air-bag 18. With regard to the reinforcing member 36, a plurality (3 in the embodiment) of cutout holes 36a are formed in each of longitudinally opposite end portions, and these cutout holes 36a have different diameters such that the closer to the longitudinally opposite end portion side the larger the diameter.

Since the folded reinforcing member 36 is disposed so as not to overlap a windshield-side folded portion 18b and an outer panel-side folded portion 18c of the air-bag 18, it is possible to prevent the operation of folding the reinforcing member 36 and the air-bag 18 from becoming complicated.

The sheet thickness of a metal air-bag is generally on the order of 0.7 mm, but the sheet thickness of the air-bag 18 of the present embodiment is 0.4 mm to 0.5 mm, which is thinner than the above, and deployment of the longitudinally opposite end portions of the air-bag 18, which are difficult to deploy, becomes easy. Furthermore, it is possible to freely set the sheet thickness of the reinforcing member 36.

When the air-bag 18 is deployed, since the longitudinally opposite end portions are connected in a folded state to blocking members 24 and 24, they are difficult to deploy compared with the longitudinally central portion. As a result, the longitudinally central portion of the air-bag 18 is deployed into a substantially circular cross section, whereas the longitudinally opposite end portions are deployed into a shape having projections and recesses due to the folded part not being completely released; due to the projections and recesses functioning as reinforcing ribs, there is a possibility that the rigidity at the time of a collision with a pedestrian will become too high for effective impact absorption performance to be exhibited.

However, in the present embodiment, since the sheet thickness of the air-bag 18 is 0.4 mm to 0.5 mm, which is thinner than a normal thickness of 0.7 mm, it is possible to fully deploy the longitudinally opposite end portions of the air-bag 18 to thus prevent the rigidity from becoming locally high, and even if a pedestrian collides with longitudinally opposite end portions of the air-bag 18, effective impact absorption performance can be exhibited.

On the other hand, since the sheet thickness of the longitudinally central portion of the air-bag 18 is thinner than a normal thickness, there is a possibility that the deployment shape will become unstable or bottoming out (a state in which the air-bag 18 is completely collapsed and inner faces are in contact with each other) will occur at the time of a collision with a pedestrian, but since the longitudinally central portion of the air-bag 18 is reinforced by the reinforcing member 36, as shown in FIG. 29, the distance between inner faces of the air-bag 18 is restricted to thus stabilize the deployment shape, the rigidity is enhanced by the reinforcing member 36 buckling at the time of a collision with a pedestrian, bottoming out is prevented, and sufficient impact absorption performance can be exhibited. This enables the impact absorption performance to be made uniform over the entire longitudinal length of the air-bag 18.

Furthermore, since the reinforcing member 36 is provided only on the longitudinally central portion of the air-bag 18, stress is concentrated on a portion where the longitudinally opposite end portions of the reinforcing member 36 contact the air-bag 18 at the time of deployment, and there is a possibility that the air-bag 18 will break, but by decreasing the strength by forming cutout holes 36a in the longitudinally opposite end portions of the reinforcing member 36 the strength can be reduced, thereby preventing the concentration of stress and avoiding breakage of the air-bag 18. In this arrangement, since the cutout holes 36a have diameters such that the further they are toward the longitudinally opposite end portion side the larger the diameter, the strength of the reinforcing member 36 changes gently along the longitudinal direction, and concentration of stress can be prevented more effectively.

Modes for carrying out the present invention are explained above, but the present invention may be modified in a variety of ways as long as the modifications do not depart from the spirit and scope thereof.

For example, the manner of folding the air-bag 18 is not limited to that of the embodiments, and any way of folding may be employed.

Furthermore, the arrangement of the vent holes 18g and the auxiliary vent holes 18g' is not limited to that of the embodiments.

Moreover, the number and shape of the cutout holes 36a of the reinforcing member 36 are not limited to those of the embodiment.

The invention claimed is:

1. An air-bag device for absorbing impact by deploying a tube-shaped air-bag with a gas generated by an inflator, the tube-shaped air-bag being formed by folding a metal sheet, and the tube-shaped air-bag having longitudinally opposite ends blocked by a blocking member,
the deployed air-bag having a complete deployment portion positioned on the longitudinally central side and having a substantially constant diameter and incomplete deployment portions positioned on longitudinally opposite end sides and having a diameter that gradually decreases in going toward the blocking member,
wherein the air-bag comprises a plurality of vent holes formed in a valley portion or main portion of the fold of the incomplete deployment portion,
wherein the complete deployment portion comprises an auxiliary vent hole at a position adjacent to the incomplete deployment portion, and
wherein the auxiliary vent hole is disposed so as to be biased further toward the front face side of the air-bag than are the vent holes.

2. The air-bag device according to claim 1, wherein the vent holes are disposed at a fixed pitch in a longitudinal direction and a circumferential direction of the air-bag.

3. The air-bag device according to claim 1, wherein the vent holes are formed in the main portion of the fold.

4. The air-bag device according to claim 1, wherein the vent holes are disposed more on a front face side and less on a rear face side of the air-bag.

5. The air-bag device according to claim 1, wherein the number of the vent holes decreases in going closer to the complete deployment portion.

6. The air-bag device according to claim 1, wherein opposite end parts of the folded air-bag are bendably welded with welds to the blocking member.

7. The air-bag device according to claim 6, wherein an end face of the opening of the air-bag is abutted against the blocking member and welded thereto with the welds.

8. The air-bag device according to claim 1, wherein the blocking member is folded in a zigzag manner.

9. The air-bag device according to claim 8, wherein the blocking member is formed into a squared U shape so as to comprise a blocking portion welded with a weld to the end face of the opening and a pair of side wall portions bent from the blocking portion so as to cover side faces of the air-bag.

10. The air-bag device according to claim 6, wherein the blocking member is formed into a cap shape so as to comprise a blocking portion abutted against the end face of the opening and a tubular portion bent from the periphery of the blocking portion so as to cover the entire periphery of the side face of the air-bag and welded with a weld to the side face, and the tubular portion is deformable by means of pressure from the deploying air-bag.

11. The air-bag device according to claim 10, wherein the tubular portion comprises an expandable slit.

12. The air-bag device according to claim 1, wherein the blocking member is fixed to a vehicle body via a deformable stay.

13. The air-bag device according to claim 1, wherein with regard to the air-bag, the sheet thickness of the longitudinally opposite end portions is thinner than the sheet thickness of the longitudinally central portion.

14. The air-bag device according to claim 13, wherein the sheet thickness of the longitudinally central portion of the air-bag is at least 0.7 mm.

15. The air-bag device according to claim 1, wherein the difference between the sheet thickness of the longitudinally opposite end portions of the air-bag and the sheet thickness of the longitudinally central portion is 0.2 mm to 0.3 mm.

16. The air-bag device according to claim 1, wherein with regard to a blank material forming the air-bag, the longitudinally opposite end portions and the longitudinally central portion, which have different sheet thicknesses, are joined via a tailored blank weld.

17. The air-bag device according to claim 1, wherein with regard to a blank material forming the air-bag, the longitudinally opposite end portions and the longitudinally central portion, which have different sheet thicknesses, are superimposed and joined via a spot weld.

18. The air-bag device according to claim 1, wherein with regard to the blank material, the length of the longitudinally opposite end portions is substantially equal to the length of the longitudinally central portion.

19. The air-bag device according to claim 1, wherein inner faces of the longitudinally central portion of the air-bag are connected via a reinforcing member formed from a metal sheet.

20. The air-bag device according to claim 19, wherein the reinforcing member is housed in the interior of the air-bag in a zigzag manner.

21. The air-bag device according to claim 19, wherein the air-bag has a sheet thickness of 0.4 mm to 0.5 mm.

22. The air-bag device according to claim 19, wherein the reinforcing member comprises a cutout hole at least on a side toward longitudinally opposite end portions of the air-bag.

23. The air-bag device according to claim 22, wherein a plurality of the cutout holes are formed, the closer the cutout hole is to longitudinally opposite end portions of the air-bag, the larger the diameter thereof.

\* \* \* \* \*